United States Patent
Tajik et al.

(10) Patent No.: US 11,900,912 B2
(45) Date of Patent: *Feb. 13, 2024

(54) SURFACE APPROPRIATE COLLISIONS

(71) Applicant: Magic Leap, Inc., Plantation, FL (US)

(72) Inventors: Anastasia Andreyevna Tajik, Fort Lauderdale, FL (US); Colby Nelson Leider, Coral Gables, FL (US); Omer Perry, Tel Aviv (IL)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/185,272

(22) Filed: Mar. 16, 2023

(65) Prior Publication Data

US 2023/0223003 A1 Jul. 13, 2023

Related U.S. Application Data

(63) Continuation of application No. 17/332,913, filed on May 27, 2021, now Pat. No. 11,636,843.

(60) Provisional application No. 63/032,427, filed on May 29, 2020.

(51) Int. Cl.
*G10K 15/02* (2006.01)
*G06V 20/40* (2022.01)
*G10L 25/57* (2013.01)
*H04R 1/08* (2006.01)
*H04S 3/00* (2006.01)
*H04S 7/00* (2006.01)
*G06V 20/20* (2022.01)
(Continued)

(52) U.S. Cl.
CPC ............ *G10K 15/02* (2013.01); *G06V 20/41* (2022.01); *G10L 25/57* (2013.01); *H04R 1/08* (2013.01); *H04S 3/008* (2013.01); *H04S 7/303* (2013.01); *G06V 20/44* (2022.01); *H04S 2400/11* (2013.01)

(58) Field of Classification Search
None
See application file for complete search history.

(56) References Cited

U.S. PATENT DOCUMENTS

| | | |
|---|---|---|
| 4,852,988 A | 8/1989 | Velez |
| 6,433,760 B1 | 8/2002 | Vaissie |
| 6,491,391 B1 | 12/2002 | Blum et al. |

(Continued)

FOREIGN PATENT DOCUMENTS

| | | |
|---|---|---|
| CA | 2316473 A1 | 1/2001 |
| CA | 2362895 A1 | 12/2002 |

(Continued)

OTHER PUBLICATIONS

Chines Final Office Action dated Jun. 16, 2022, for CN Application No. 201980012935.2, with English translation, 16 pages.

(Continued)

*Primary Examiner* — Qin Zhu
(74) *Attorney, Agent, or Firm* — Morrison & Foerster LLP

(57) ABSTRACT

Disclosed herein are systems and methods for presenting an audio signal associated with presentation of a virtual object colliding with a surface. The virtual object and the surface may be associated with a mixed reality environment. Generation of the audio signal may be based on at least one of an audio stream from a microphone and a video stream form a sensor. In some embodiments, the collision between the virtual object and the surface is associated with a footstep on the surface.

20 Claims, 10 Drawing Sheets

(51) Int. Cl.
  *G06V 40/18*  (2022.01)
  *G06F 3/16*  (2006.01)

(56) References Cited

U.S. PATENT DOCUMENTS

| | | | |
|---|---|---|---|
| 6,847,336 | B1 | 1/2005 | Lemelson |
| 6,943,754 | B2 | 9/2005 | Aughey |
| 6,977,776 | B2 | 12/2005 | Volkenandt et al. |
| 7,347,551 | B2 | 3/2008 | Fergason et al. |
| 7,488,294 | B2 | 2/2009 | Torch |
| 8,235,529 | B1 | 8/2012 | Raffle |
| 8,611,015 | B2 | 12/2013 | Wheeler |
| 8,638,498 | B2 | 1/2014 | Bohn et al. |
| 8,696,113 | B2 | 4/2014 | Lewis |
| 8,831,255 | B2 | 9/2014 | Crawford |
| 8,929,589 | B2 | 1/2015 | Publicover et al. |
| 9,010,929 | B2 | 4/2015 | Lewis |
| 9,183,676 | B2 | 11/2015 | Mcculloch et al. |
| 9,274,338 | B2 | 3/2016 | Robbins et al. |
| 9,292,973 | B2 | 3/2016 | Bar-Zeev et al. |
| 9,418,479 | B1 | 8/2016 | Worley, III et al. |
| 9,720,505 | B2 | 8/2017 | Gribetz et al. |
| 10,013,053 | B2 | 7/2018 | Cederlund et al. |
| 10,025,379 | B2 | 7/2018 | Drake et al. |
| 11,337,023 | B2 | 5/2022 | Leider et al. |
| 11,403,825 | B2 | 8/2022 | Tajik |
| 11,632,646 | B2 | 4/2023 | Leider et al. |
| 11,636,843 | B2 | 4/2023 | Tajik et al. |
| 11,657,585 | B2 | 5/2023 | Tajik |
| 2002/0005108 | A1 | 1/2002 | Ludwig |
| 2003/0030597 | A1 | 2/2003 | Geist |
| 2006/0023158 | A1 | 2/2006 | Howell et al. |
| 2008/0013746 | A1 | 1/2008 | Reichelt et al. |
| 2011/0211056 | A1 | 9/2011 | Publicover et al. |
| 2011/0213664 | A1 | 9/2011 | Osterhout |
| 2012/0021806 | A1 | 1/2012 | Maltz |
| 2013/0286004 | A1 | 10/2013 | Mcculloch et al. |
| 2014/0195918 | A1 | 7/2014 | Friedlander |
| 2015/0141102 | A1 | 5/2015 | Asami et al. |
| 2015/0168731 | A1 | 6/2015 | Robbins |
| 2016/0212272 | A1 | 7/2016 | Srinivasan |
| 2018/0220251 | A1 | 8/2018 | Brettle et al. |
| 2019/0116448 | A1 | 4/2019 | Schmidt |
| 2020/0368616 | A1 | 11/2020 | Delamont |
| 2021/0248803 | A1 | 8/2021 | Kojima et al. |
| 2021/0264677 | A1 | 8/2021 | Ishihara et al. |
| 2021/0375257 | A1 | 12/2021 | Tajik et al. |
| 2021/0377693 | A1 | 12/2021 | Bouba et al. |
| 2022/0240044 | A1 | 7/2022 | Leider et al. |
| 2022/0327788 | A1 | 10/2022 | Tajik |
| 2023/0217205 | A1 | 7/2023 | Leider et al. |
| 2023/0245405 | A1 | 8/2023 | Tajik |

FOREIGN PATENT DOCUMENTS

| | | | |
|---|---|---|---|
| CA | 2388766 | A1 | 12/2003 |
| CN | 102902355 | A | 1/2013 |
| CN | 103201731 | A | 7/2013 |
| JP | 2014039597 | A | 3/2014 |
| WO | 2012074528 | A1 | 6/2012 |
| WO | 2018026828 | A1 | 2/2018 |
| WO | 2018224847 | A2 | 12/2018 |
| WO | 2019161312 | A1 | 8/2019 |
| WO | 2021243098 | A1 | 12/2021 |

OTHER PUBLICATIONS

Chines Notice of Allowance dated Nov. 22, 2022, for CN Application No. 201980012935.2, with English translation, 6 pages.
Chines Office Action dated Dec. 3, 2021, for CN Application No. 201980012935.2, with English Translation, 12 pages.
Chines Office Action dated Mar. 22, 2022, for CN Application No. 201980012935.2, with English translation, 18 pages.
Chines Office Action dated May 11, 2021, for CN Application No. 201980012935.2, with English Translation, 14 pages.
International Preliminary Report on Patentability dated Aug. 18, 2020, for PCT Application No. PCT/US2019/18366, filed Feb. 15, 2019, six pages.
International Preliminary Report on Patentability dated Dec. 8, 2022, for PCT Application No. PCT/US2021/34639, filed May 27, 2021, nine pages.
International Search Report and Written Opinion, dated Aug. 31, 2021, for PCT Application No. PCT/US2021/34639, filed May 27, 2021, fourteen pages,.
International Search Report and Written Opinion, dated Jun. 11, 2019, for PCT Application No. PCT/US2019/18366, filed Feb. 15, 2019, 14 pages.
Israeli Office Action dated Jan. 29, 2023, for IL Patent Application No. 276511, three pages.
Jacob, R. "Eye Tracking in Advanced Interface Design", Virtual Environments and Advanced Interface Design, Oxford University Press, Inc. (Jun. 1995).
Japanese Office Action dated Dec. 26, 2022, for JP Application No. 2020-543357, with English translation, 15 pages.
Non Final Office Action dated Aug. 9, 2022, for U.S. Appl. No. 17/332,913, filed May 27, 2021, ten pages.
Non Final Office Action dated Feb. 17, 2022, for U.S. Appl. No. 16/970,323, filed Aug. 14, 2020, nineteen pages.
Non-Final Office Action dated Nov. 25, 2022, for U.S. Appl. No. 17/852,158, filed Jun. 28, 2022, nine pages.
Non-Final Office Action dated Oct. 13, 2022, for U.S. Appl. No. 17/719,273, filed Apr. 12, 2022, sixteen pages.
Notice of Allowance dated Dec. 16, 2022, for U.S. Appl. No. 17/332,913, filed May 27, 2021, six pages.
Notice of Allowance dated Feb. 8, 2023, for U.S. Appl. No. 17/719,273, filed Apr. 12, 2022, ten pages.
Notice of Allowance dated Mar. 7, 2022, for U.S. Appl. No. 17/127,204, filed Dec. 18, 2020, nine pages.
Notice of Allowance dated May 26, 2022, for U.S. Appl. No. 16/970,323, filed Aug. 14, 2020, five pages.
Rolland, J. et al., "High-resolution inset head- mounted display", Optical Society of America, vol. 37, No. 19, Applied Optics, (Jul. 1, 1998).
Tanriverdi, V. et al. (Apr. 2000). "Interacting With Eye Movements In Virtual Environments," Department of Electrical Engineering and Computer Science, Tufts University, Medford, MA 02155, USA, Proceedings of the SIGCHI conference on Human Factors in Computing Systems, eight pages.
Yoshida, A. et al., "Design and Applications of a High Resolution Insert Head Mounted Display", (Jun. 1994).
Notice of Allowance dated Mar. 10, 2023, for U.S. Appl. No. 17/852,158, filed Jun. 28, 2022, five pages.
Israeli Notice of Allowance dated May 22, 2023, for IL Patent Application No. 276511, four pages.
Japanese Notice of Allowance dated Jul. 4, 2023, for JP Application No. 2020-543357, with English translation, 6 pages.
European Search Report dated Oct. 31, 2023, for EP Application No. 21812191.1, seven pages.

SURFACE APPROPRIATE COLLISIONS

CROSS-REFERENCE TO RELATED APPLICATIONS

This application is a Continuation of U.S. Non-Provisional application Ser. No. 17/332,913, filed May 27, 2021, which claims benefit of U.S. Provisional Application No. 63/032,427, filed May 29, 2020, the contents of which are incorporated herein by reference in their entirety.

FIELD

This disclosure relates in general to systems and methods for presenting immersive audio content, and in particular to systems and methods for presenting immersive audio content in a mixed reality environment.

BACKGROUND

Virtual environments are ubiquitous in computing environments, finding use in video games (in which a virtual environment may represent a game world); maps (in which a virtual environment may represent terrain to be navigated); simulations (in which a virtual environment may simulate a real environment); digital storytelling (in which virtual characters may interact with each other in a virtual environment); and many other applications. Modern computer users are generally comfortable perceiving, and interacting with, virtual environments. However, users' experiences with virtual environments can be limited by the technology for presenting virtual environments. For example, conventional displays (e.g., 2D display screens) and audio systems (e.g., fixed speakers) may be unable to realize a virtual environment in ways that create a compelling, realistic, and immersive experience.

Virtual reality ("VR"), augmented reality ("AR"), mixed reality ("MR"), and related technologies (collectively, "XR") share an ability to present, to a user of a XR system, sensory information corresponding to a virtual environment represented by data in a computer system. Such systems can offer a uniquely heightened sense of immersion and realism by combining virtual visual and audio cues with real sights and sounds. Accordingly, it can be desirable to present digital sounds to a user of a XR system in such a way that the sounds seem to be occurring—naturally, and consistently with the user's expectations of the sound—in the user's real environment. Generally speaking, users expect that virtual sounds will take on the acoustic properties of the real environment in which they are heard. For instance, a user of a XR system in a large concert hall will expect the virtual sounds of the XR system to have large, cavernous sonic qualities; conversely, a user in a small apartment will expect the sounds to be more dampened, close, and immediate. In addition to matching virtual sounds with acoustic properties of a real and/or virtual environment, realism is further enhanced by spatializing virtual sounds. For example, a virtual object may visually fly past a user from behind, and the user may expect the corresponding virtual sound to similarly reflect the spatial movement of the virtual object with respect to the user.

Existing technologies often fall short of these expectations, such as by presenting virtual audio that does not take into account a user's surroundings or does not correspond to spatial movements of a virtual object, leading to feelings of inauthenticity that can compromise the user experience. Observations of users of XR systems indicate that while users may be relatively forgiving of visual mismatches between virtual content and a real environment (e.g., inconsistencies in lighting); users may be more sensitive to auditory mismatches. Our own auditory experiences, refined continuously throughout our lives, can make us acutely aware of how our physical environments affect the sounds we hear; and we can be hyper-aware of sounds that are inconsistent with those expectations. With XR systems, such inconsistencies can be jarring, and can turn an immersive and compelling experience into a gimmicky, imitative one. In extreme examples, auditory inconsistencies can cause motion sickness and other ill effects as the inner ear is unable to reconcile auditory stimuli with their corresponding visual cues.

In particular, users of XR systems may be acutely aware of auditory mismatches of collisions between virtual objects and other virtual or real objects. Such collisions, including footsteps, may play an important role in the immersion of an XR environment. When a virtual character is walking around a user's real environment, the user may expect to hear footsteps as if the virtual character were a real person. For example, a user may expect to hear footsteps with a particular characteristic sound when the virtual character is walking around wood floors, and the user may expect a different characteristic sound when the virtual character is walking around concrete. If audio is played that doesn't match a user's expectations (or if no audio is played at all), the user's immersion may be disrupted, regardless of how visually realistic the virtual character may appear to be. It can therefore be desirable to develop systems and methods for identifying and generating accurate collision sounds between virtual objects and other virtual or real objects.

BRIEF SUMMARY

Disclosed herein are systems and methods for presenting an audio signal associated with presentation of a virtual object colliding with a surface. The virtual object and the surface may be associated with a mixed reality environment. Generation of the audio signal may be based on at least one of an audio stream from a microphone and a video stream form a sensor. In some embodiments, the collision between the virtual object and the surface is associated with a footstep on the surface. In some embodiments, occurrence of a trigger event is determined and in accordance with this determination, a timestamp associated with the trigger event is identified. The timestamp may be used to generate an audio signal that the audio signal associated with presentation of the virtual object colliding with a surface is based on. The audio signal associated with the presentation of the collision may be associated with a material of the surface. Methods and systems for determining the material are disclosed herein.

In some embodiments, a method comprises: generating, via a microphone of a wearable head device, an audio stream; generating, via a sensor of the wearable head device, a video stream; determining that a trigger event has occurred; in accordance with a determination that the trigger event has occurred: identifying a timestamp associated with the trigger event; identifying a portion of the audio stream based on the timestamp; identifying a portion of the video stream based on the timestamp; and generating a first audio signal based on at least one of the portion of the audio stream and the portion of the video stream; presenting a virtual object colliding with a surface, wherein the surface is associated with the trigger event; generating a second audio signal based on the first audio signal; and presenting the second audio signal.

In some embodiments, the trigger event comprises a footstep on the surface.

In some embodiments, determining that the trigger event has occurred is based on movement data of the wearable head device.

In some embodiments, determining that the trigger event has occurred is based on inertial data of the wearable head device.

In some embodiments, determining that the trigger event has occurred is based on inertial data of an auxiliary device, and the auxiliary device is coupled to the wearable head device.

In some embodiments, the method further comprises: in accordance with the determination that the trigger event has occurred: identifying a position of the wearable head device based on the timestamp; determining a position of the trigger event based on the position of the wearable head device; and associating the position of the trigger event with the first audio signal.

In some embodiments, the method further comprises: determining a position of the collision of the virtual object with the surface; and determining whether the position of the collision of the virtual object with the surface is associated with the position of the trigger event, wherein generating the second audio signal is further based on a determination that the position of the collision of the virtual object with the surface is associated with the position of the trigger event.

In some embodiments, generating the second audio signal is further based on at least one of a physical model of the surface and a physical model of the virtual object.

In some embodiments, generating the second audio signal is further based on analysis-and-resynthesis of the first audio signal.

In some embodiments, the method further comprises: in accordance with the determination that the trigger event has occurred, associating the first audio signal with the surface.

In some embodiments, the second audio signal corresponds to the collision of the virtual object with the surface.

In some embodiments, the method further comprises storing the first audio signal, wherein: the collision of the virtual object with the surface is presented on a display of a second wearable head device, and generating the second audio signal is further based on the stored first audio signal.

In some embodiments, the method further comprises: generating a second audio stream; generating a second video stream; determining that a second trigger event has occurred; in accordance with a determination that the second trigger event has occurred: identifying a second timestamp associated with the trigger event; identifying a portion of the second audio stream based on the second timestamp; identifying a portion of the second video stream based on the second timestamp; and generating a third audio signal based on at least one of the portion of the second audio stream and the portion of the second video stream, wherein generating the second audio signal is further based on the third audio signal.

In some embodiments, the video stream includes information associated with the surface.

In some embodiments, the virtual object comprises a foot of a virtual character.

In some embodiments, a material of the surface is associated with an acoustic property, and generating the second audio signal is further based on the acoustic property of the material of the surface.

In some embodiments, the method further comprises determining the acoustic property of the material of the surface based on at least one of measured coefficient of absorption of the material, manual definition, acoustic data, and inertial data.

In some embodiments, a system comprises: a microphone; a sensor; a display; an audio output; and one or more processors configured to execute a method comprising: generating, via the microphone, an audio stream; generating, via the sensor, a video stream; determining that a trigger event has occurred; in accordance with a determination that the trigger event has occurred: identifying a timestamp associated with the trigger event; identifying a portion of the audio stream based on the timestamp; identifying a portion of the video stream based on the timestamp; and generating a first audio signal based on at least one of the portion of the audio stream and the portion of the video stream; presenting, on the display, a virtual object colliding with a surface, wherein the surface is associated with the trigger event; generating a second audio signal based on the first audio signal; and presenting, via the audio output, the second audio signal.

In some embodiments, the trigger event comprises a footstep on the surface.

In some embodiments, the system further comprises a second sensor, wherein determining that the trigger event has occurred is based on movement data captured by the second sensor.

In some embodiments, the system further comprises an inertial measurement unit, wherein determining that the trigger event has occurred is based on inertial data captured by the inertial measurement unit.

In some embodiments, the system further comprises an auxiliary device and a wearable head device, wherein: determining that the trigger event has occurred is based on inertial data of the auxiliary device, and the auxiliary device is coupled to the wearable head device.

In some embodiments, the method further comprises: in accordance with the determination that the trigger event has occurred: identifying a position of a wearable head device of the system based on the timestamp; determining a position of the trigger event based on the position of the wearable head device of the system; and associating the position of the trigger event with the first audio signal.

In some embodiments, the method further comprises: determining a position of the collision of the virtual object with the surface; and determining whether the position of the collision of the virtual object with the surface is associated with the position of the trigger event, wherein generating the second audio signal is further based on a determination that the position of the collision of the virtual object with the surface is associated with the position of the trigger event.

In some embodiments, generating the second audio signal is further based on at least one of a physical model of the surface and a physical model of the virtual object.

In some embodiments, generating the second audio signal is further based on analysis-and-resynthesis of the first audio signal.

In some embodiments, the method further comprises: in accordance with the determination that the trigger event has occurred, associating the first audio signal with the surface.

In some embodiments, the second audio signal corresponds to the collision of the virtual object with the surface.

In some embodiments, the method further comprises storing the first audio signal, wherein: the collision of the virtual object with the surface is presented on a display of a second system, and generating the second audio signal is further based on the stored first audio signal.

In some embodiments, the method further comprises: generating a second audio stream; generating a second video stream; determining that a second trigger event has occurred; in accordance with a determination that the second trigger event has occurred: identifying a second timestamp associated with the trigger event; identifying a portion of the second audio stream based on the second timestamp; identifying a portion of the second video stream based on the second timestamp; and generating a third audio signal based on at least one of the portion of the second audio stream and the portion of the second video stream; wherein generating the second audio signal is further based on the third audio signal.

In some embodiments, the video stream includes information associated with the surface.

In some embodiments, the virtual object comprises a foot of a virtual character.

In some embodiments, a material of the surface is associated with an acoustic property, and generating the second audio signal is further based on the acoustic property of the material of the surface.

In some embodiments, the method further comprises determining the acoustic property of the material of the surface based on at least one of measured coefficient of absorption of the material, manual definition, acoustic data, and inertial data.

In some embodiments, a non-transitory computer-readable medium stores one or more instructions, which, when executed by one or more processors of an electronic device, cause the device to perform a method comprising: generating, via a microphone of a wearable head device, an audio stream; generating, via a sensor of the wearable head device, a video stream; determining that a trigger event has occurred; in accordance with a determination that the trigger event has occurred: identifying a timestamp associated with the trigger event; identifying a portion of the audio stream based on the timestamp; identifying a portion of the video stream based on the timestamp; and generating a first audio signal based on at least one of the portion of the audio stream and the portion of the video stream; presenting a virtual object colliding with a surface, wherein the surface is associated with the trigger event; generating a second audio signal based on the first audio signal; and presenting the second audio signal.

In some embodiments, the trigger event comprises a footstep on the surface.

In some embodiments, determining that the trigger event has occurred is based on movement data of the wearable head device.

In some embodiments, determining that the trigger event has occurred is based on inertial data of the wearable head device.

In some embodiments, determining that the trigger event has occurred is based on inertial data of an auxiliary device, and the auxiliary device is coupled to the wearable head device.

In some embodiments, the method further comprises: in accordance with the determination that the trigger event has occurred: identifying a position of the wearable head device based on the timestamp; determining a position of the trigger event based on the position of the wearable head device; and associating the position of the trigger event with the first audio signal.

In some embodiments, the method further comprises: determining a position of the collision of the virtual object with the surface; and determining whether the position of the collision of the virtual object with the surface is associated with the position of the trigger event, wherein generating the second audio signal is further based on a determination that the position of the collision of the virtual object with the surface is associated with the position of the trigger event.

In some embodiments, generating the second audio signal is further based on at least one of a physical model of the surface and a physical model of the virtual object.

In some embodiments, generating the second audio signal is further based on analysis-and-resynthesis of the first audio signal.

In some embodiments, the method further comprises: in accordance with the determination that the trigger event has occurred, associating the first audio signal with the surface.

In some embodiments, the second audio signal corresponds to the collision of the virtual object with the surface.

In some embodiments, the method further comprises storing the first audio signal, wherein: the collision of the virtual object with the surface is presented on a display of a second wearable head device, and generating the second audio signal is further based on the stored first audio signal.

In some embodiments, the method further comprises: generating a second audio stream; generating a second video stream; determining that a second trigger event has occurred; in accordance with a determination that the second trigger event has occurred: identifying a second timestamp associated with the trigger event; identifying a portion of the second audio stream based on the second timestamp; identifying a portion of the second video stream based on the second timestamp; and generating a third audio signal based on at least one of the portion of the second audio stream and the portion of the second video stream, wherein generating the second audio signal is further based on the third audio signal.

In some embodiments, the video stream includes information associated with the surface.

In some embodiments, the virtual object comprises a foot of a virtual character.

In some embodiments, a material of the surface is associated with an acoustic property, and generating the second audio signal is further based on the acoustic property of the material of the surface.

In some embodiments, the method further comprises determining the acoustic property of the material of the surface based on at least one of measured coefficient of absorption of the material, manual definition, acoustic data, and inertial data.

DETAILED DESCRIPTION

Figure 1A:
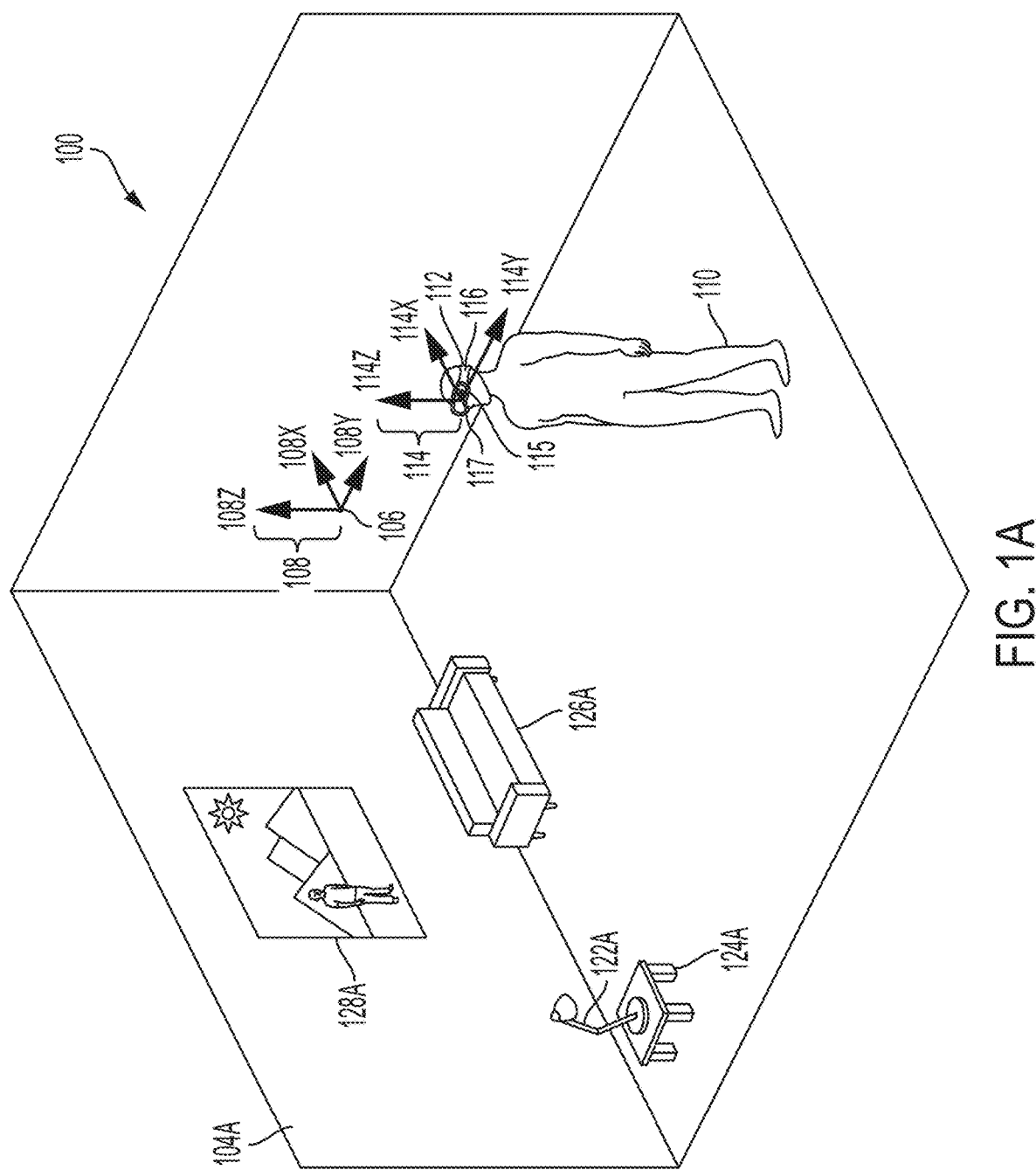
FIGS. 1A-1C illustrate exemplary mixed reality environments, according to some embodiments.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Mixed Reality Environment

Like all people, a user of a mixed reality system exists in a real environment—that is, a three-dimensional portion of the "real world," and all of its contents, that are perceptible by the user. For example, a user perceives a real environment using one's ordinary human senses—sight, sound, touch, taste, smell—and interacts with the real environment by moving one's own body in the real environment. Locations in a real environment can be described as coordinates in a coordinate space; for example, a coordinate can include latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time t0, based on data associated with the virtual environment and/or input provided by a user, a state of the virtual environment at a second time t1. For instance, if an object in the virtual environment is located at a first coordinate at time t0, and has certain programmed physical parameters (e.g., mass, coefficient of friction); and an input received from user indicates that a force should be applied to the object in a direction vector; the processor can apply laws of kinematics to determine a location of the object at time t1 using basic mechanics. The processor can use any suitable information known about the virtual environment, and/or any suitable input, to determine a state of the virtual environment at a time t1. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects; people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate—for instance, an audio signal corresponding to a composite of sounds in the virtual environment, and mixed and processed to simulate an audio signal that would be heard by a listener at the listener coordinate—and present the audio signal to a user via one or more speakers.

Because a virtual environment exists as a computational structure, a user may not directly perceive a virtual environment using one's ordinary senses. Instead, a user can perceive a virtual environment indirectly, as presented to the user, for example by a display, speakers, haptic output devices, etc. Similarly, a user may not directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

A mixed reality system can present to the user, for example using a transmissive display and/or one or more speakers (which may, for example, be incorporated into a wearable head device), a mixed reality environment ("MRE") that combines aspects of a real environment and a virtual environment. In some embodiments, the one or more speakers may be external to the wearable head device. As used herein, an MRE is a simultaneous representation of a real environment and a corresponding virtual environment. In some examples, the corresponding real and virtual environments share a single coordinate space; in some examples, a real coordinate space and a corresponding virtual coordinate space are related to each other by a transformation matrix (or other suitable representation). Accordingly, a single coordinate (along with, in some examples, a transformation matrix) can define a first location in the real environment, and also a second, corresponding, location in the virtual environment; and vice versa.

In an MRE, a virtual object (e.g., in a virtual environment associated with the MRE) can correspond to a real object (e.g., in a real environment associated with the MRE). For instance, if the real environment of an MRE includes a real lamp post (a real object) at a location coordinate, the virtual environment of the MRE may include a virtual lamp post (a virtual object) at a corresponding location coordinate. As used herein, the real object in combination with its corresponding virtual object together constitute a "mixed reality object." It is not necessary for a virtual object to perfectly match or align with a corresponding real object. In some examples, a virtual object can be a simplified version of a corresponding real object. For instance, if a real environment includes a real lamp post, a corresponding virtual object may include a cylinder of roughly the same height and radius as the real lamp post (reflecting that lamp posts may be roughly cylindrical in shape). Simplifying virtual objects in this manner can allow computational efficiencies, and can simplify calculations to be performed on such virtual objects. Further, in some examples of an MRE, not all real objects in a real environment may be associated with a corresponding virtual object. Likewise, in some examples of an MRE, not all virtual objects in a virtual environment may be associated with a corresponding real object. That is, some virtual objects may solely in a virtual environment of an MRE, without any real-world counterpart.

In some examples, virtual objects may have characteristics that differ, sometimes drastically, from those of corresponding real objects. For instance, while a real environment in an MRE may include a green, two-armed cactus—a prickly inanimate object—a corresponding virtual object in the MRE may have the characteristics of a green, two-armed virtual character with human facial features and a surly demeanor. In this example, the virtual object resembles its corresponding real object in certain characteristics (color, number of arms); but differs from the real object in other characteristics (facial features, personality). In this way, virtual objects have the potential to represent real objects in a creative, abstract, exaggerated, or fanciful manner; or to impart behaviors (e.g., human personalities) to otherwise inanimate real objects. In some examples, virtual objects may be purely fanciful creations with no real-world counterpart (e.g., a virtual monster in a virtual environment, perhaps at a location corresponding to an empty space in a real environment).

Compared to VR systems, which present the user with a virtual environment while obscuring the real environment, a mixed reality system presenting an MRE affords the advantage that the real environment remains perceptible while the virtual environment is presented. Accordingly, the user of the mixed reality system is able to use visual and audio cues associated with the real environment to experience and interact with the corresponding virtual environment. As an example, while a user of VR systems may struggle to perceive or interact with a virtual object displayed in a virtual environment—because, as noted herein, a user may not directly perceive or interact with a virtual environment—a user of an MR system may find it more intuitive and natural to interact with a virtual object by seeing, hearing, and touching a corresponding real object in his or her own real environment. This level of interactivity may heighten a user's feelings of immersion, connection, and engagement with a virtual environment. Similarly, by simultaneously presenting a real environment and a virtual environment, mixed reality systems may reduce negative psychological feelings (e.g., cognitive dissonance) and negative physical feelings (e.g., motion sickness) associated with VR systems. Mixed reality systems further offer many possibilities for applications that may augment or alter our experiences of the real world.

FIG. 1A illustrates an exemplary real environment 100 in which a user 110 uses a mixed reality system 112. Mixed reality system 112 may include a display (e.g., a transmissive display), one or more speakers, and one or more sensors (e.g., a camera), for example as described herein. The real environment 100 shown includes a rectangular room 104A, in which user 110 is standing;

and real objects 122A (a lamp), 124A (a table), 126A (a sofa), and 128A (a painting). Room 104A may be spatially described with a location coordinate (e.g., coordinate system 108); locations of the real environment 100 may be described with respect to an origin of the location coordinate (e.g., point 106). As shown in FIG. 1A, an environment/world coordinate system 108 (comprising an x-axis 108X, a y-axis 108Y, and a z-axis 108Z) with its origin at point 106 (a world coordinate), can define a coordinate space for real environment 100. In some embodiments, the origin point 106 of the environment/world coordinate system 108 may correspond to where the mixed reality system 112 was powered on. In some embodiments, the origin point 106 of the environment/world coordinate system 108 may be reset during operation. In some examples, user 110 may be considered a real object in real environment 100; similarly, user 110's body parts (e.g., hands, feet) may be considered real objects in real environment 100. In some examples, a user/listener/head coordinate system 114 (comprising an x-axis 114X, a y-axis 114Y, and a z-axis 114Z) with its origin at point 115 (e.g., user/listener/head coordinate) can define a coordinate space for the user/listener/head on which the mixed reality system 112 is located. The origin point 115 of the user/listener/head coordinate system 114 may be defined relative to one or more components of the mixed reality system 112. For example, the origin point 115 of the user/listener/head coordinate system 114 may be defined relative to the display of the mixed reality system 112 such as during initial calibration of the mixed reality system 112. A matrix (which may include a translation matrix and a quaternion matrix, or other rotation matrix), or other suitable representation can characterize a transformation between the user/listener/head coordinate system 114 space and the environment/world coordinate system 108 space. In some embodiments, a left ear coordinate 116 and a right ear coordinate 117 may be defined relative to the origin point 115 of the user/listener/head coordinate system 114. A matrix (which may include a translation matrix and a quaternion matrix, or other rotation matrix), or other suitable representation can characterize a transformation between the left ear coordinate 116 and the right ear coordinate 117, and user/listener/head coordinate system 114 space. The user/listener/head coordinate system 114 can simplify the representation of locations relative to the user's head, or to a head-mounted device, for example, relative to the environment/world coordinate system 108. Using Simultaneous Localization and Mapping (SLAM), visual odometry, or other techniques, a transformation between user coordinate system 114 and environment coordinate system 108 can be determined and updated in real-time.

Figure 1B:
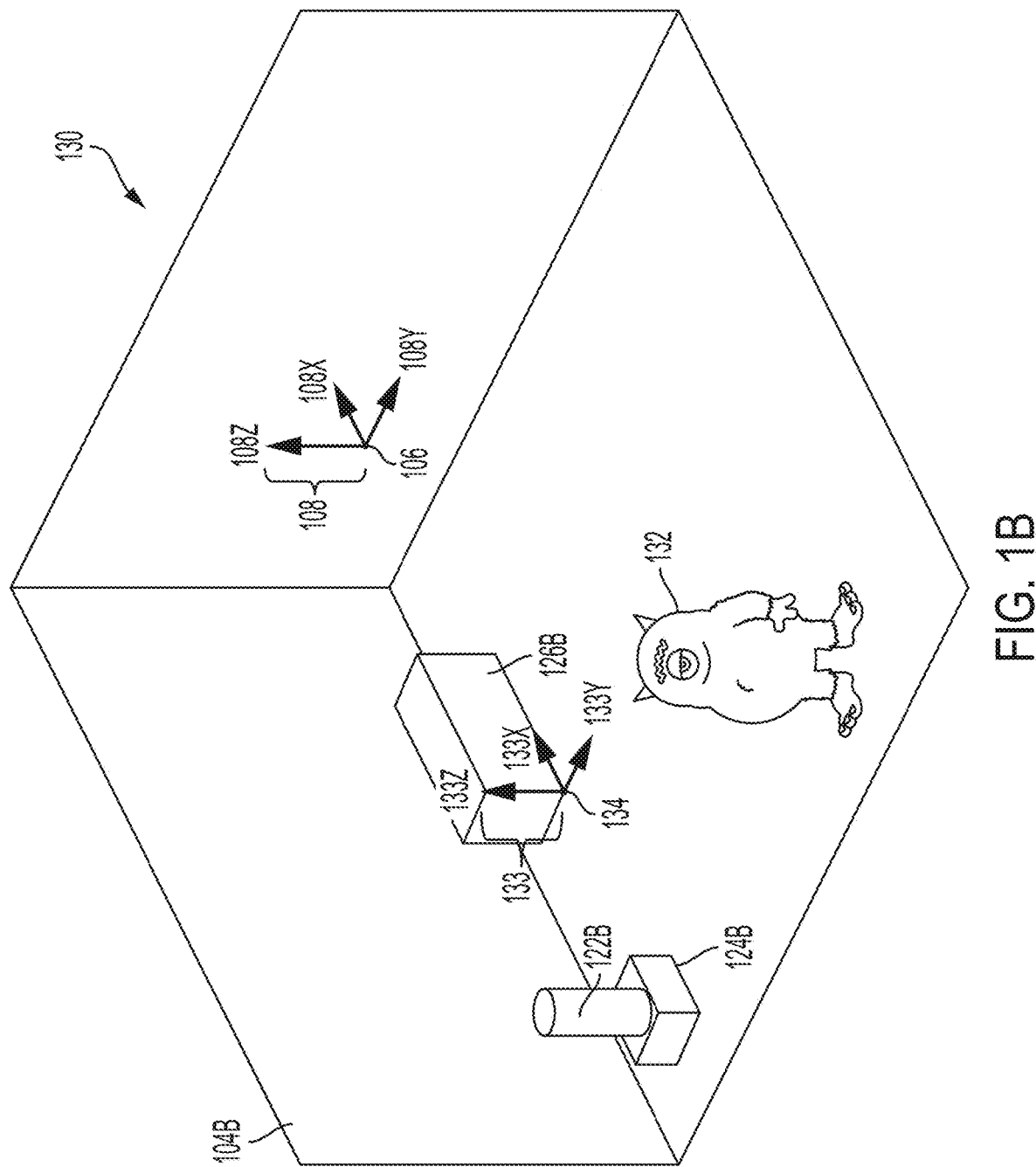

FIG. 1B illustrates an exemplary virtual environment 130 that corresponds to real environment 100. The virtual environment 130 shown includes a virtual rectangular room 104B corresponding to real rectangular room 104A; a virtual object 122B corresponding to real object 122A; a virtual object 124B corresponding to real object 124A; and a virtual object 126B corresponding to real object 126A. Metadata associated with the virtual objects 122B, 124B, 126B can include information derived from the corresponding real objects 122A, 124A, 126A. Virtual environment 130 additionally includes a virtual monster 132, which may not correspond to any real object in real environment 100. Real object 128A in real environment 100 may not correspond to any virtual object in virtual environment 130. A persistent coordinate system 133 (comprising an x-axis 133X, a y-axis 133Y, and a z-axis 133Z) with its origin at point 134 (persistent coordinate), can define a coordinate space for virtual content. The origin point 134 of the persistent coordinate system 133 may be defined relative/with respect to one or more real objects, such as the real object 126A. A matrix (which may include a translation matrix and a quaternion matrix or other rotation matrix), or other suitable representation can characterize a transformation between the persistent coordinate system 133 space and the environment/ world coordinate system 108 space. In some embodiments, each of the virtual objects 122B, 124B, 126B, and 132 may have its own persistent coordinate point relative to the origin point 134 of the persistent coordinate system 133. In some embodiments, there may be multiple persistent coordinate systems and each of the virtual objects 122B, 124B, 126B, and 132 may have its own persistent coordinate points relative to one or more persistent coordinate systems.

Persistent coordinate data may be coordinate data that persists relative to a physical environment. Persistent coordinate data may be used by MR systems (e.g., MR system 112, 200) to place persistent virtual content, which may not be tied to movement of a display on which the virtual object is being displayed. For example, a two-dimensional screen may display virtual objects relative to a position on the screen. As the two-dimensional screen moves, the virtual content may move with the screen. In some embodiments, persistent virtual content may be displayed in a corner of a room. A MR user may look at the corner, see the virtual content, look away from the corner (where the virtual content may no longer be visible because the virtual content may have moved from within the user's field of view to a location outside the user's field of view due to motion of the user's head), and look back to see the virtual content in the corner (similar to how a real object may behave).

In some embodiments, persistent coordinate data (e.g., a persistent coordinate system and/or a persistent coordinate frame) can include an origin point and three axes. For example, a persistent coordinate system may be assigned to a center of a room by a MR system. In some embodiments, a user may move around the room, out of the room, re-enter the room, etc., and the persistent coordinate system may remain at the center of the room (e.g., because it persists relative to the physical environment). In some embodiments, a virtual object may be displayed using a transform to persistent coordinate data, which may enable displaying persistent virtual content. In some embodiments, a MR system may use simultaneous localization and mapping to generate persistent coordinate data (e.g., the MR system may assign a persistent coordinate system to a point in space). In some embodiments, a MR system may map an environment by generating persistent coordinate data at regular intervals (e.g., a MR system may assign persistent coordinate systems in a grid where persistent coordinate systems may be at least within five feet of another persistent coordinate system).

In some embodiments, persistent coordinate data may be generated by a MR system and transmitted to a remote server. In some embodiments, a remote server may be configured to receive persistent coordinate data. In some embodiments, a remote server may be configured to synchronize persistent coordinate data from multiple observation instances. For example, multiple MR systems may map the same room with persistent coordinate data and transmit that data to a remote server. In some embodiments, the remote server may use this observation data to generate canonical persistent coordinate data, which may be based on the one or more observations. In some embodiments, canonical persistent coordinate data may be more accurate and/or reliable than a single observation of persistent coordinate data. In some embodiments, canonical persistent coordinate data may be transmitted to one or more MR systems. For example, a MR system may use image recognition and/or location data to recognize that it is located in a room that has corresponding canonical persistent coordinate data (e.g., because other MR systems have previously mapped the room). In some embodiments, the MR system may receive canonical persistent coordinate data corresponding to its location from a remote server.

With respect to FIGS. 1A and 1B, environment/world coordinate system 108 defines a shared coordinate space for both real environment 100 and virtual environment 130. In the example shown, the coordinate space has its origin at point 106. Further, the coordinate space is defined by the same three orthogonal axes (108X, 108Y, 108Z). Accordingly, a first location in real environment 100, and a second, corresponding location in virtual environment 130, can be described with respect to the same coordinate space. This simplifies identifying and displaying corresponding locations in real and virtual environments, because the same coordinates can be used to identify both locations. However, in some examples, corresponding real and virtual environments need not use a shared coordinate space. For instance, in some examples (not shown), a matrix (which may include a translation matrix and a quaternion matrix, or other rotation matrix), or other suitable representation can characterize a transformation between a real environment coordinate space and a virtual environment coordinate space.

Figure 1C:
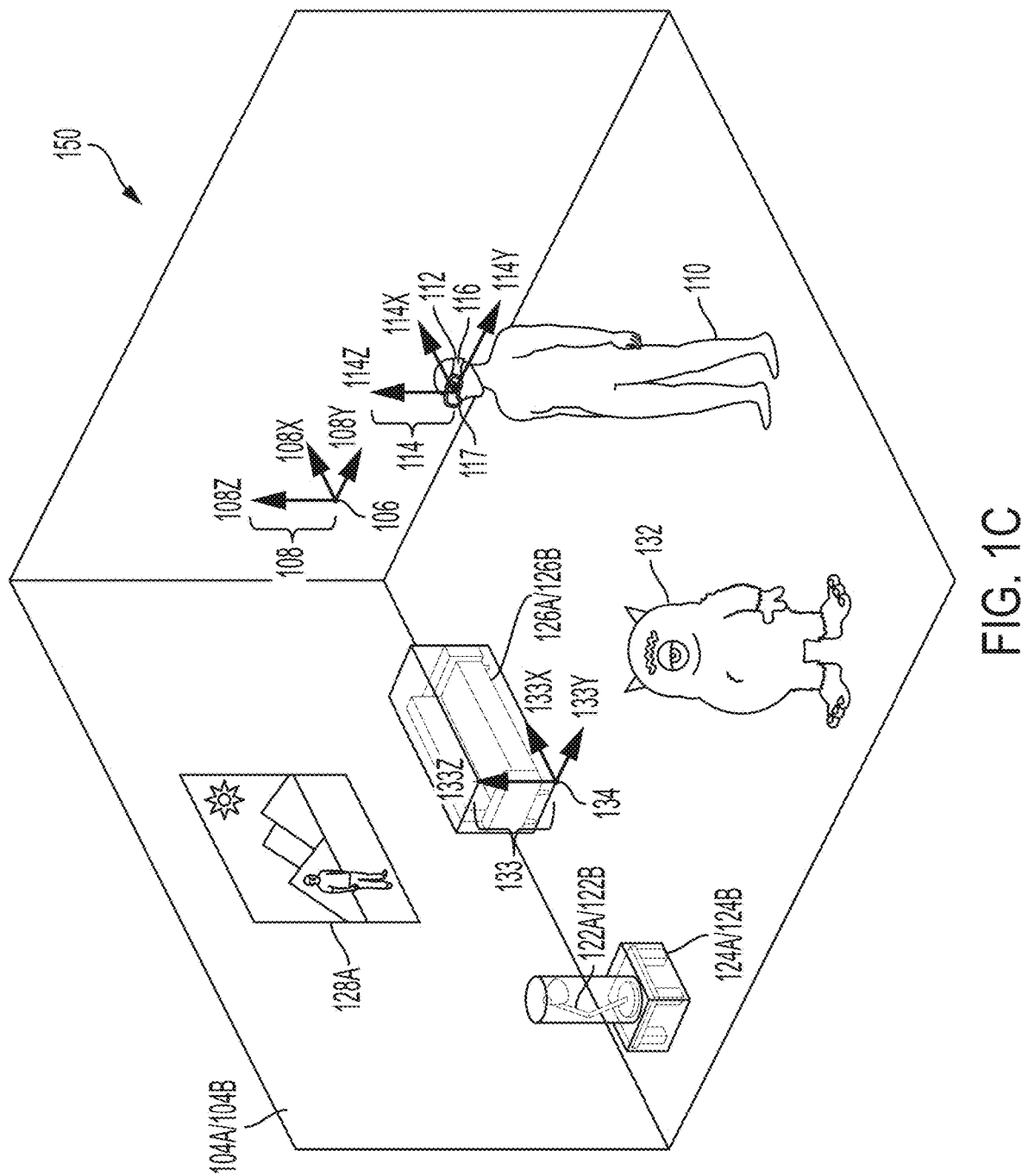

FIG. 1C illustrates an exemplary MRE 150 that simultaneously presents aspects of real environment 100 and virtual environment 130 to user 110 via mixed reality system 112. In the example shown, MRE 150 simultaneously presents user 110 with real objects 122A, 124A, 126A, and 128A from real environment 100 (e.g., via a transmissive portion of a display of mixed reality system 112); and virtual objects 122B, 124B, 126B, and 132 from virtual environment 130 (e.g., via an active display portion of the display of mixed reality system 112). As described herein, origin point 106 acts as an origin for a coordinate space corresponding to MRE 150, and coordinate system 108 defines an x-axis, y-axis, and z-axis for the coordinate space.

In the example shown, mixed reality objects include corresponding pairs of real objects and virtual objects (e.g., 122A/122B, 124A/124B, 126A/126B) that occupy corresponding locations in coordinate space 108. In some examples, both the real objects and the virtual objects may be simultaneously visible to user 110. This may be desirable in, for example, instances where the virtual object presents information designed to augment a view of the corresponding real object (such as in a museum application where a virtual object presents the missing pieces of an ancient damaged sculpture). In some examples, the virtual objects (122B, 124B, and/or 126B) may be displayed (e.g., via active pixelated occlusion using a pixelated occlusion shutter) so as to occlude the corresponding real objects (122A, 124A, and/or 126A). This may be desirable in, for example, instances where the virtual object acts as a visual replacement for the corresponding real object (such as in an interactive storytelling application where an inanimate real object becomes a "living" character).

In some examples, real objects (e.g., 122A, 124A, 126A) may be associated with virtual content or helper data that may not necessarily constitute virtual objects. Virtual content or helper data can facilitate processing or handling of virtual objects in the mixed reality environment. For example, such virtual content could include two-dimensional representations of corresponding real objects; custom asset types associated with corresponding real objects; or statistical data associated with corresponding real objects.

This information can enable or facilitate calculations involving a real object without incurring unnecessary computational overhead.

In some examples, the presentation described herein may also incorporate audio aspects. For instance, in MRE 150, virtual monster 132 could be associated with one or more audio signals, such as a footstep sound effect that is generated as the monster walks around MRE 150. As described herein, a processor of mixed reality system 112 can compute an audio signal corresponding to a mixed and processed composite of all such sounds in MRE 150, and present the audio signal to user 110 via one or more speakers included in mixed reality system 112 and/or one or more external speakers.

Example Mixed Reality System

Example mixed reality system 112 can include a wearable head device (e.g., a wearable augmented reality or mixed reality head device) comprising a display (which may include left and right transmissive displays, which may be near-eye displays, and associated components for coupling light from the displays to the user's eyes); left and right speakers (e.g., positioned adjacent to the user's left and right ears, respectively); an inertial measurement unit (IMU) (e.g., mounted to a temple arm of the head device); an orthogonal coil electromagnetic receiver (e.g., mounted to the left temple piece); left and right cameras (e.g., depth (time-of-flight) cameras) oriented away from the user; and left and right eye cameras oriented toward the user (e.g., for detecting the user's eye movements). However, a mixed reality system 112 can incorporate any suitable display technology, and any suitable sensors (e.g., optical, infrared, acoustic, LIDAR, EOG, GPS, magnetic). In addition, mixed reality system 112 may incorporate networking features (e.g., Wi-Fi capability, mobile network (e.g., 4G, 5G) capability) to communicate with other devices and systems, including other mixed reality systems. Mixed reality system 112 may further include a battery (which may be mounted in an auxiliary unit, such as a belt pack designed to be worn around a user's waist), a processor, and a memory. The wearable head device of mixed reality system 112 may include tracking components, such as an IMU or other suitable sensors, configured to output a set of coordinates of the wearable head device relative to the user's environment. In some examples, tracking components may provide input to a processor performing a Simultaneous Localization and Mapping (SLAM) and/or visual odometry algorithm. In some examples, mixed reality system 112 may also include a handheld controller 300, and/or an auxiliary unit 320, which may be a wearable beltpack, as described herein.

Figure 2A:
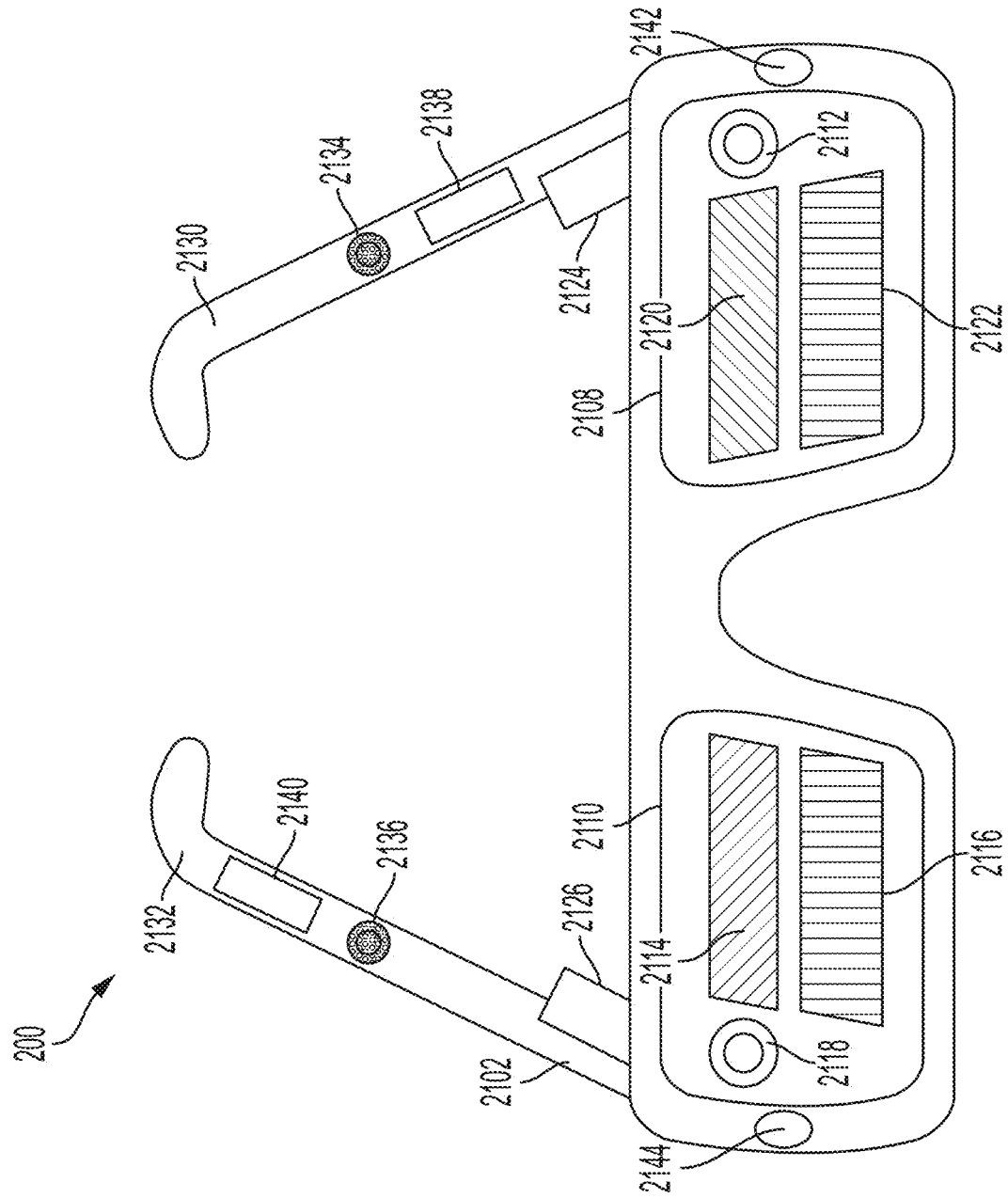
FIGS. 2A-2D illustrate components of exemplary mixed reality systems, according to some embodiments.
Figure 2B:
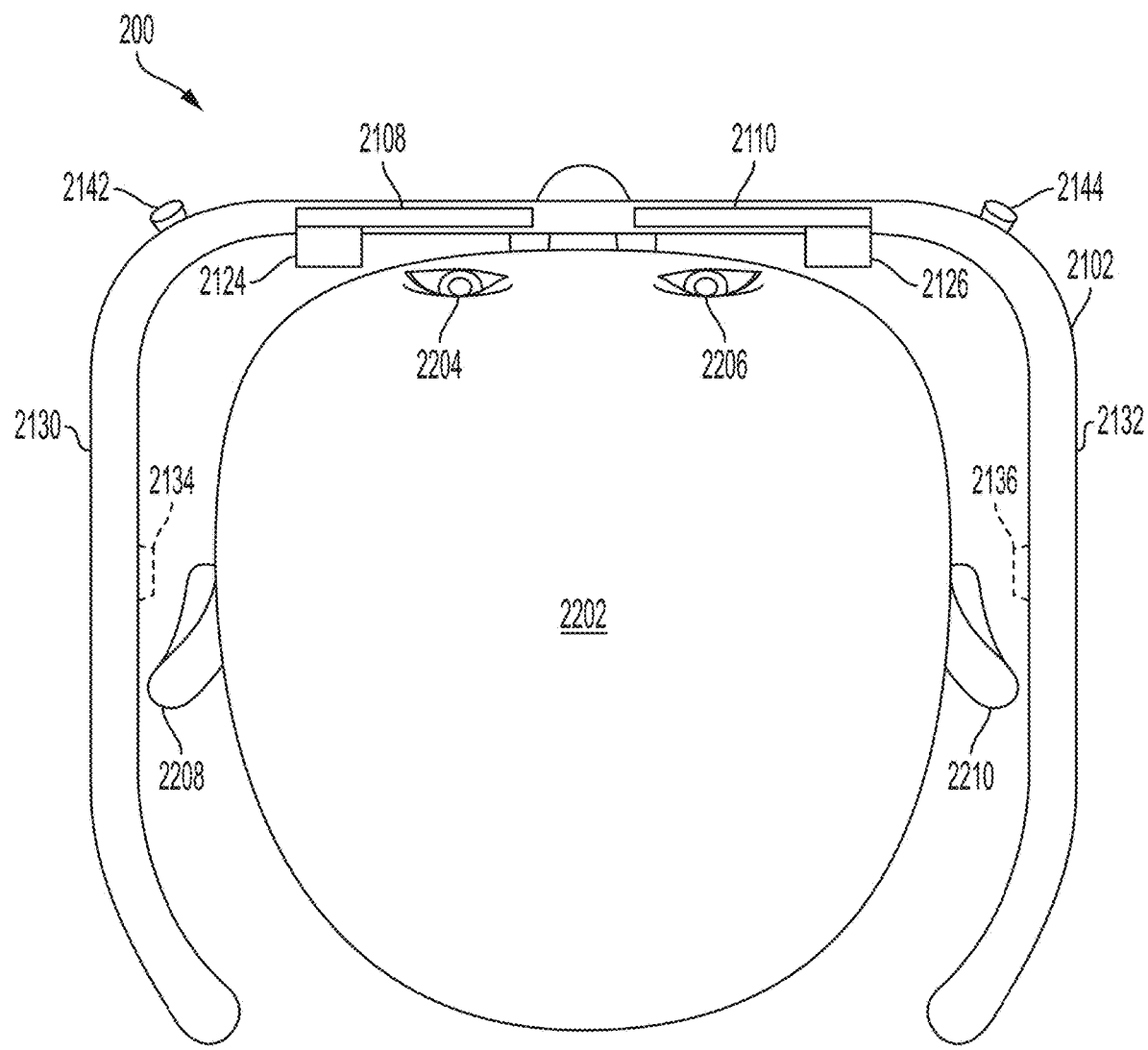
Figure 2C:
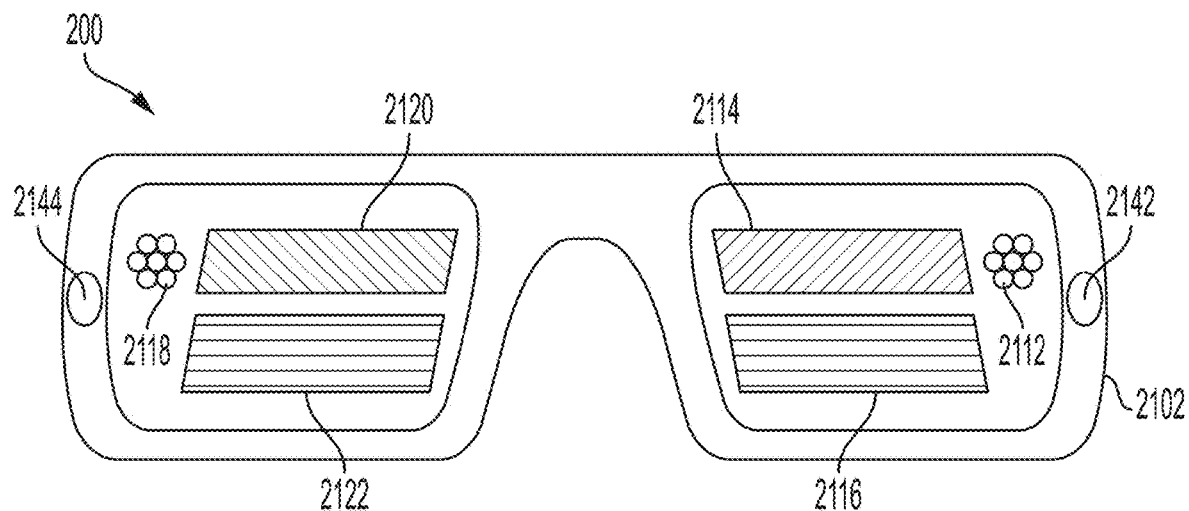
Figure 2D:
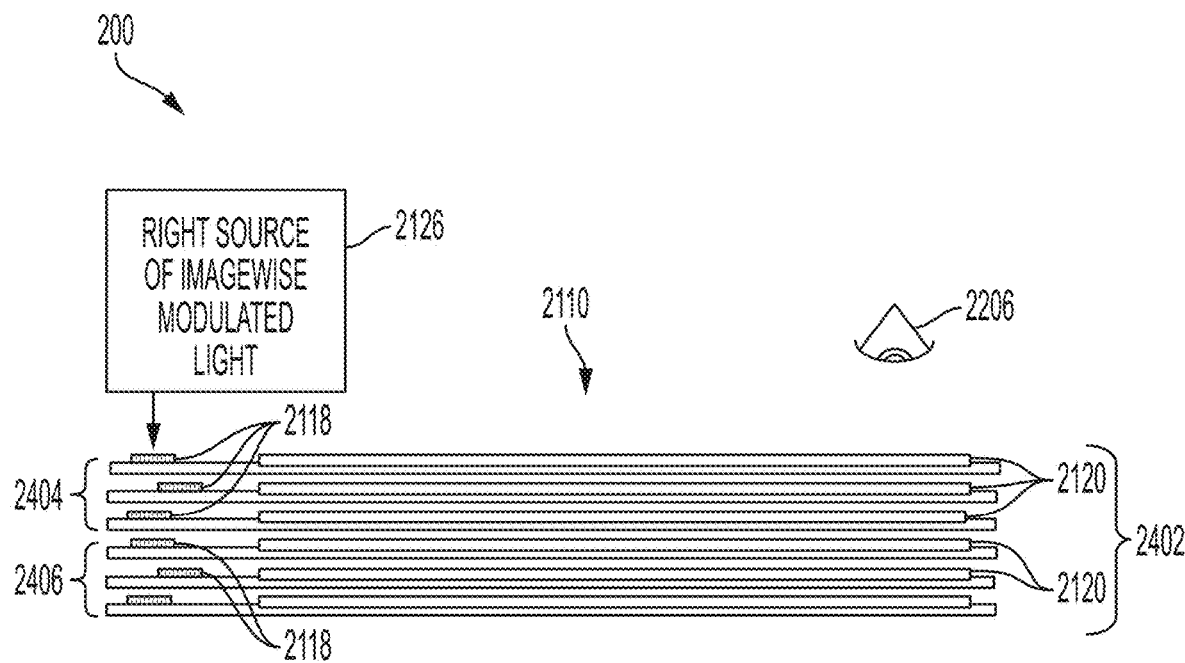

FIGS. 2A-2D illustrate components of an exemplary mixed reality system 200 (which may correspond to mixed reality system 112) that may be used to present an MRE (which may correspond to MRE 150), or other virtual environment, to a user. FIG. 2A illustrates a perspective view of a wearable head device 2102 included in example mixed reality system 200. FIG. 2B illustrates a top view of wearable head device 2102 worn on a user's head 2202. FIG. 2C illustrates a front view of wearable head device 2102. FIG. 2D illustrates an edge view of example eyepiece 2110 of wearable head device 2102. As shown in FIGS. 2A-2C, the example wearable head device 2102 includes an exemplary left eyepiece (e.g., a left transparent waveguide set eyepiece) 2108 and an exemplary right eyepiece (e.g., a right transparent waveguide set eyepiece) 2110. Each eyepiece 2108 and 2110 can include transmissive elements through which a real environment can be visible, as well as display elements for presenting a display (e.g., via imagewise modulated light) overlapping the real environment. In some examples, such display elements can include surface diffractive optical elements for controlling the flow of imagewise modulated light. For instance, the left eyepiece 2108 can include a left incoupling grating set 2112, a left orthogonal pupil expansion (OPE) grating set 2120, and a left exit (output) pupil expansion (EPE) grating set 2122. Similarly, the right eyepiece 2110 can include a right incoupling grating set 2118, a right OPE grating set 2114 and a right EPE grating set 2116. Imagewise modulated light can be transferred to a user's eye via the incoupling gratings 2112 and 2118, OPEs 2114 and 2120, and EPE 2116 and 2122. Each incoupling grating set 2112, 2118 can be configured to deflect light toward its corresponding OPE grating set 2120, 2114. Each OPE grating set 2120, 2114 can be designed to incrementally deflect light down toward its associated EPE 2122, 2116, thereby horizontally extending an exit pupil being formed. Each EPE 2122, 2116 can be configured to incrementally redirect at least a portion of light received from its corresponding OPE grating set 2120, 2114 outward to a user eyebox position (not shown) defined behind the eyepieces 2108, 2110, vertically extending the exit pupil that is formed at the eyebox. Alternatively, in lieu of the incoupling grating sets 2112 and 2118, OPE grating sets 2114 and 2120, and EPE grating sets 2116 and 2122, the eyepieces 2108 and 2110 can include other arrangements of gratings and/or refractive and reflective features for controlling the coupling of imagewise modulated light to the user's eyes.

In some examples, wearable head device 2102 can include a left temple arm 2130 and a right temple arm 2132, where the left temple arm 2130 includes a left speaker 2134 and the right temple arm 2132 includes a right speaker 2136. An orthogonal coil electromagnetic receiver 2138 can be located in the left temple piece, or in another suitable location in the wearable head unit 2102. An Inertial Measurement Unit (IMU) 2140 can be located in the right temple arm 2132, or in another suitable location in the wearable head device 2102. The wearable head device 2102 can also include a left depth (e.g., time-of-flight) camera 2142 and a right depth camera 2144. The depth cameras 2142, 2144 can be suitably oriented in different directions so as to together cover a wider field of view.

In the example shown in FIGS. 2A-2D, a left source of imagewise modulated light 2124 can be optically coupled into the left eyepiece 2108 through the left incoupling grating set 2112, and a right source of imagewise modulated light 2126 can be optically coupled into the right eyepiece 2110 through the right incoupling grating set 2118. Sources of imagewise modulated light 2124, 2126 can include, for example, optical fiber scanners; projectors including electronic light modulators such as Digital Light Processing (DLP) chips or Liquid Crystal on Silicon (LCoS) modulators; or emissive displays, such as micro Light Emitting Diode (μLED) or micro Organic Light Emitting Diode (μOLED) panels coupled into the incoupling grating sets 2112, 2118 using one or more lenses per side. The input coupling grating sets 2112, 2118 can deflect light from the sources of imagewise modulated light 2124, 2126 to angles above the critical angle for Total Internal Reflection (TIR) for the eyepieces 2108, 2110. The OPE grating sets 2114, 2120 incrementally deflect light propagating by TIR down toward the EPE grating sets 2116, 2122. The EPE grating sets 2116, 2122 incrementally couple light toward the user's face, including the pupils of the user's eyes.

In some examples, as shown in FIG. 2D, each of the left eyepiece 2108 and the right eyepiece 2110 includes a plurality of waveguides 2402. For example, each eyepiece 2108, 2110 can include multiple individual waveguides, each dedicated to a respective color channel (e.g., red, blue, and green). In some examples, each eyepiece 2108, 2110 can include multiple sets of such waveguides, with each set configured to impart different wavefront curvature to emitted light. The wavefront curvature may be convex with respect to the user's eyes, for example to present a virtual object positioned a distance in front of the user (e.g., by a distance corresponding to the reciprocal of wavefront curvature). In some examples, EPE grating sets 2116, 2122 can include curved grating grooves to effect convex wavefront curvature by altering the Poynting vector of exiting light across each EPE.

In some examples, to create a perception that displayed content is three-dimensional, stereoscopically-adjusted left and right eye imagery can be presented to the user through the imagewise light modulators 2124, 2126 and the eyepieces 2108, 2110. The perceived realism of a presentation of a three-dimensional virtual object can be enhanced by selecting waveguides (and thus corresponding the wavefront curvatures) such that the virtual object is displayed at a distance approximating a distance indicated by the stereoscopic left and right images. This technique may also reduce motion sickness experienced by some users, which may be caused by differences between the depth perception cues provided by stereoscopic left and right eye imagery, and the autonomic accommodation (e.g., object distance-dependent focus) of the human eye.

FIG. 2D illustrates an edge-facing view from the top of the right eyepiece 2110 of example wearable head device 2102. As shown in FIG. 2D, the plurality of waveguides 2402 can include a first subset of three waveguides 2404 and a second subset of three waveguides 2406. The two subsets of waveguides 2404, 2406 can be differentiated by different EPE gratings featuring different grating line curvatures to impart different wavefront curvatures to exiting light. Within each of the subsets of waveguides 2404, 2406 each waveguide can be used to couple a different spectral channel (e.g., one of red, green and blue spectral channels) to the user's right eye 2206. Although not shown in FIG. 2D, the structure of the left eyepiece 2108 may be mirrored relative to the structure of the right eyepiece 2110.

Figure 3A:
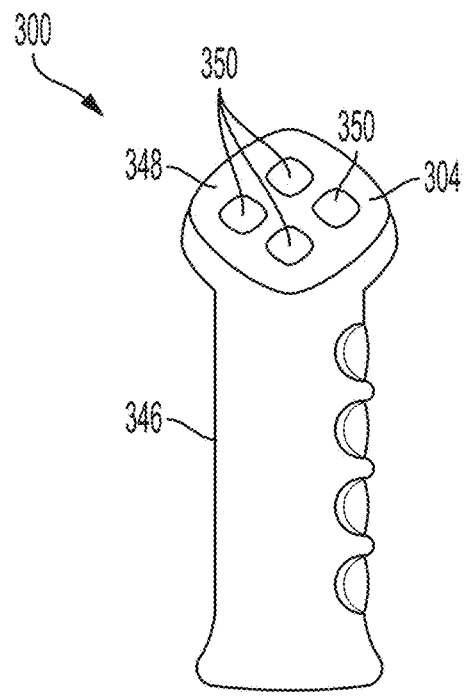
FIG. 3A illustrates an exemplary mixed reality handheld controller, according to some embodiments.

FIG. 3A illustrates an exemplary handheld controller component 300 of a mixed reality system 200. In some examples, handheld controller 300 includes a grip portion 346 and one or more buttons 350 disposed along a top surface 348. In some examples, buttons 350 may be configured for use as an optical tracking target, e.g., for tracking six-degree-of-freedom (6DOF) motion of the handheld controller 300, in conjunction with a camera or other optical sensor (which may be mounted in a head unit (e.g., wearable head device 2102) of mixed reality system 200). In some examples, handheld controller 300 includes tracking components (e.g., an IMU or other suitable sensors) for detecting position or orientation, such as position or orientation relative to wearable head device 2102. In some examples, such tracking components may be positioned in a handle of handheld controller 300, and/or may be mechanically coupled to the handheld controller. Handheld controller 300 can be configured to provide one or more output signals corresponding to one or more of a pressed state of the buttons; or a position, orientation, and/or motion of the handheld controller 300 (e.g., via an IMU). Such output signals may be used as input to a processor of mixed reality system 200. Such input may correspond to a position, orientation, and/or movement of the handheld controller (and, by extension, to a position, orientation, and/or movement of a hand of a user holding the controller). Such input may also correspond to a user pressing buttons 350.

Figure 3B:
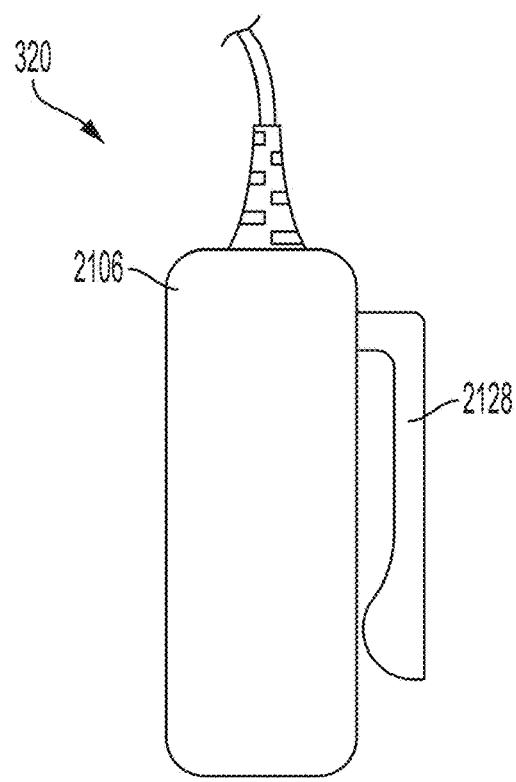
FIG. 3B illustrates an exemplary auxiliary unit, according to some embodiments.

FIG. 3B illustrates an exemplary auxiliary unit 320 of a mixed reality system 200. The auxiliary unit 320 can include a battery to provide energy to operate the system 200, and can include a processor for executing programs to operate the system 200. As shown, the example auxiliary unit 320 includes a clip 2128, such as for attaching the auxiliary unit 320 to a user's belt. Other form factors are suitable for auxiliary unit 320 and will be apparent, including form factors that do not involve mounting the unit to a user's belt. In some examples, auxiliary unit 320 is coupled to the wearable head device 2102 through a multiconduit cable that can include, for example, electrical wires and fiber optics. Wireless connections between the auxiliary unit 320 and the wearable head device 2102 can also be used.

In some examples, mixed reality system 200 can include one or more microphones to detect sound and provide corresponding signals to the mixed reality system. In some examples, a microphone may be attached to, or integrated with, wearable head device 2102, and may be configured to detect a user's voice. In some examples, a microphone may be attached to, or integrated with, handheld controller 300 and/or auxiliary unit 320. Such a microphone may be configured to detect environmental sounds, ambient noise, voices of a user or a third party, or other sounds.

Figure 4:
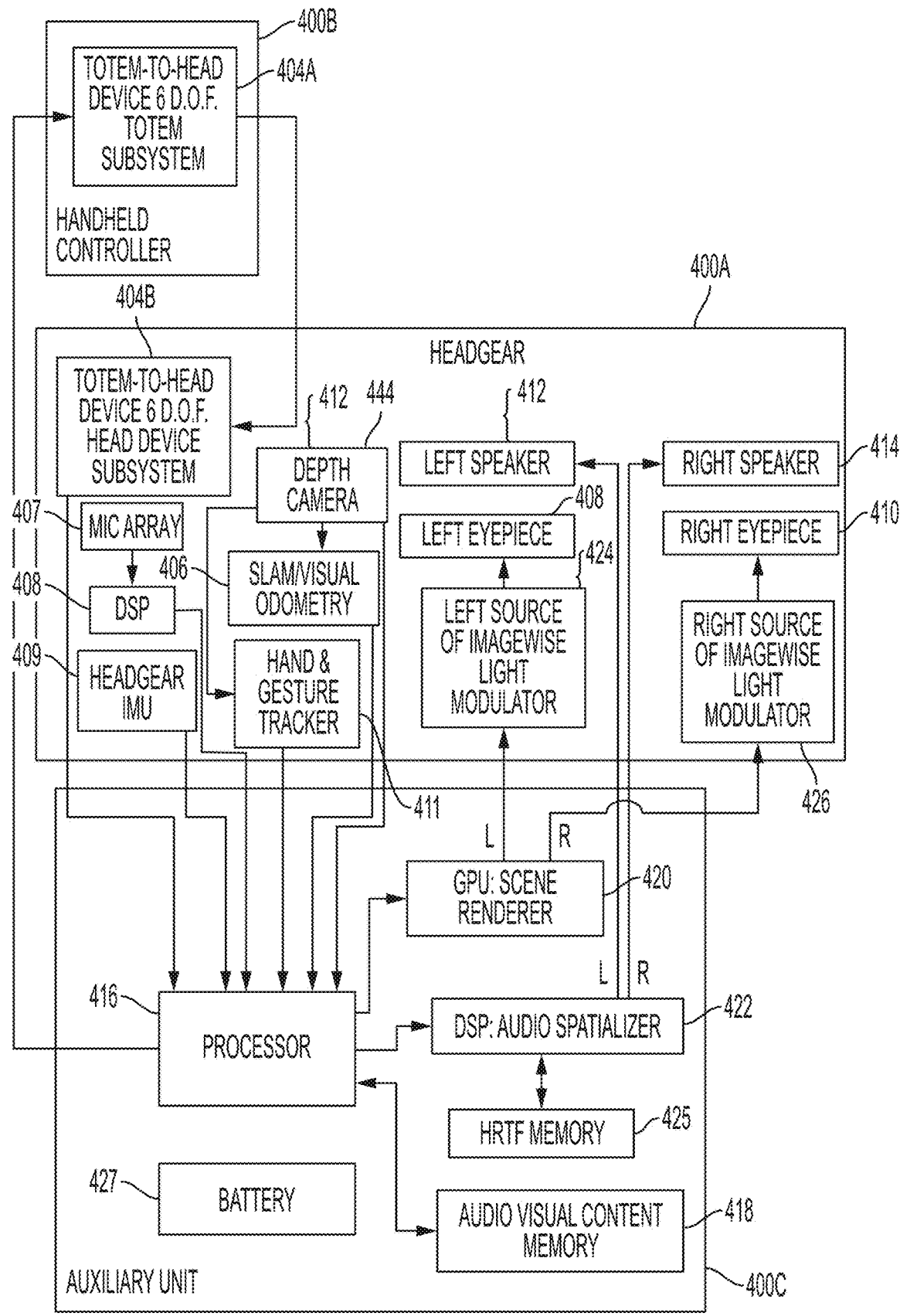
FIG. 4 illustrates an exemplary functional block diagram of an exemplary mixed reality system, according to some embodiments.

FIG. 4 shows an exemplary functional block diagram that may correspond to an exemplary mixed reality system, such as mixed reality system 200 described herein (which may correspond to mixed reality system 112 with respect to FIG. 1). As shown in FIG. 4, example handheld controller 400B (which may correspond to handheld controller 300 (a "totem")) includes a totem-to-wearable head device six degree of freedom (6DOF) totem subsystem 404A and example wearable head device 400A (which may correspond to wearable head device 2102) includes a totem-to-wearable head device 6DOF subsystem 404B. In the example, the 6DOF totem subsystem 404A and the 6DOF subsystem 404B cooperate to determine six coordinates (e.g., offsets in three translation directions and rotation along three axes) of the handheld controller 400B relative to the wearable head device 400A. The six degrees of freedom may be expressed relative to a coordinate system of the wearable head device 400A. The three translation offsets may be expressed as X, Y, and Z offsets in such a coordinate system, as a translation matrix, or as some other representation. The rotation degrees of freedom may be expressed as sequence of yaw, pitch, and roll rotations, as a rotation matrix, as a quaternion, or as some other representation. In some examples, the wearable head device 400A; one or more depth cameras 444 (and/or one or more non-depth cameras) included in the wearable head device 400A; and/or one or more optical targets (e.g., buttons 350 of handheld controller 400B as described herein, or dedicated optical targets included in the handheld controller 400B) can be used for 6DOF tracking. In some examples, the handheld controller 400B can include a camera, as described herein; and the wearable head device 400A can include an optical target for optical tracking in conjunction with the camera. In some examples, the wearable head device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6DOF of the wearable head device 400A relative to the handheld controller 400B may be determined. Additionally, 6DOF totem subsystem 404A can include an Inertial Measurement Unit (IMU) that is useful to provide improved accuracy and/or more timely information on rapid movements of the handheld controller 400B.

In some embodiments, wearable system 400 can include microphone array 407, which can include one or more microphones arranged on headgear device 400A. In some embodiments, microphone array 407 can include four microphones. Two microphones can be placed on a front face of headgear 400A, and two microphones can be placed at a rear of head headgear 400A (e.g., one at a back-left and one at a back-right). In some embodiments, signals received by microphone array 407 can be transmitted to DSP 408. DSP 408 can be configured to perform signal processing on the signals received from microphone array 407. For example, DSP 408 can be configured to perform noise reduction, acoustic echo cancellation, and/or beamforming on signals received from microphone array 407. DSP 408 can be configured to transmit signals to processor 416.

In some examples, it may become necessary to transform coordinates from a local coordinate space (e.g., a coordinate space fixed relative to the wearable head device 400A) to an inertial coordinate space (e.g., a coordinate space fixed relative to the real environment), for example in order to compensate for the movement of the wearable head device 400A (e.g., of MR system 112) relative to the coordinate system 108. For instance, such transformations may be necessary for a display of the wearable head device 400A to present a virtual object at an expected position and orientation relative to the real environment (e.g., a virtual person sitting in a real chair, facing forward, regardless of the wearable head device's position and orientation), rather than at a fixed position and orientation on the display (e.g., at the same position in the right lower corner of the display), to preserve the illusion that the virtual object exists in the real environment (and does not, for example, appear positioned unnaturally in the real environment as the wearable head device 400A shifts and rotates). In some examples, a compensatory transformation between coordinate spaces can be determined by processing imagery from the depth cameras 444 using a SLAM and/or visual odometry procedure in order to determine the transformation of the wearable head device 400A relative to the coordinate system 108. In the example shown in FIG. 4, the depth cameras 444 are coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and another coordinate space (e.g., an inertial coordinate space). Similarly, in some examples, an additional source of information on the user's head pose and location is obtained from an IMU 409. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of the wearable head device 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from the wearable head device's 6DOF headgear subsystem 404B, the IMU 409, the SLAM/visual odometry block 406, depth cameras 444, and/or the hand gesture tracker 411. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426, for example as described herein with respect to FIGS. 2A-2D. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 320). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 320 described herein). The auxiliary unit 400C may include a battery 427 to power its components and/or to supply power to the wearable head device 400A or handheld controller 400B. Including such components in an auxiliary unit, which can be mounted to a user's waist, can limit the size and weight of the wearable head device 400A, which can in turn reduce fatigue of a user's head and neck.

While FIG. 4 presents elements corresponding to various components of an example wearable systems 400, various other suitable arrangements of these components will become apparent to those skilled in the art. For example, the headgear device 400A illustrated in may include a processor and/or a battery (not shown). The included processor and/or battery may operate together with or operate in place of the processor and/or battery of the auxiliary unit 400C. Generally, as another example, elements presented or functionalities described with respect to FIG. 4 as being associated with auxiliary unit 400C could instead be associated with headgear device 400A or handheld controller 400B. Furthermore, some wearable systems may forgo entirely a handheld controller 400B or auxiliary unit 400C. Such changes and modifications are to be understood as being included within the scope of the disclosed examples.

Surface Appropriate Collisions

Because XR systems (e.g., MR system 112, 200) blend together real content with virtual content, true immersion may rely on engaging as many of a user's senses as possible. Virtual objects should look and sound as real as possible. In particular, presenting realistic sounds based on virtual objects can be challenging. Unlike presenting realistic visuals, realistic sounds may have dependencies on characteristics of a real environment that are not easily perceivable. Whereas realistic visuals may be a function of lighting, position of a user, etc. (some or all of which may be determined visually and/or passively without user interaction), realistic sounds may be a function of properties that may be more difficult to determine without user interaction. For example, acoustic properties such as absorption, transmissivity, base frequency, resonance, decay time, etc. of real objects may be relevant for generating a realistic collision sound between a virtual object and a real object, these properties may not be easily determined. Specifically, determining relevant acoustic properties may require some form of user interaction (e.g., asking a user to tap on various objects). However, requiring large amounts of user interaction may be undesirable, because such required interactions may adversely affect a user's enjoyment of the XR system.

This problem may be particularly acute for collisions between virtual objects and real objects. Acoustic properties for virtual objects may be relatively easily obtained because a virtual object may have known properties associated with it upon creation (e.g., the virtual object may be designated as made of wood, plastic, etc.). However, it may not be trivial to determine acoustic properties of real objects without user interaction because they may not be readily apparent. For example, a surface may look like wood, but actually be vinyl, and this fact may not be apparent until a real object collides with the surface and the resulting sound is recorded.

It can therefore be desirable to develop systems and methods for generating realistic audio content, specifically, generating realistic audio content with minimal required user actions. One particularly common collision sound can include footsteps (e.g., a collision between a foot or footwear and a ground surface). If a virtual character is presented as walking around a real environment, a user of an XR system may expect to hear footstep sounds that correspond to the virtual character's foot/footwear and/or the real surface of the ground. While acoustic properties of a virtual character's foot/footwear may be known and/or predefined, acoustic properties of the ground surface may not be known. It is understood that "footstep" is not limited to one foot or walking. For example, footstep may also be associated with jumping or more than one foot colliding with a surface.

In some embodiments, acoustic properties of ground surfaces can be passively determined (e.g., without specific user input). For example, as a user of an XR system walks around, information may be collected from the user's own footsteps (e.g., the footsteps are recorded), and acoustic properties of the ground surface may be extracted from the recorded audio.

In some embodiments, sensors of an XR system can be used to identify and/or tag acoustic properties of ground surfaces, and that information can be used for generating realistic acoustic sounds involving collisions with virtual objects (e.g., footsteps). For example, an XR system may continually record audio (e.g., during a calibration period). To determine which audio signals correspond to a user's footsteps, positional and/or inertial data can be used to identify when a footstep is likely to have occurred. Once a footstep has been identified, a corresponding segment of audio from the audio stream can be retrieved. In some embodiments, the audio segment can be processed and/or analyzed to determine appropriate acoustic properties of that ground surface. In some embodiments, a video stream can also be utilized. For example, a video stream may capture visual data (e.g., texture and/or pattern), which may be used to supplement audio data in determining acoustic properties of a ground surface.

Figure 5:
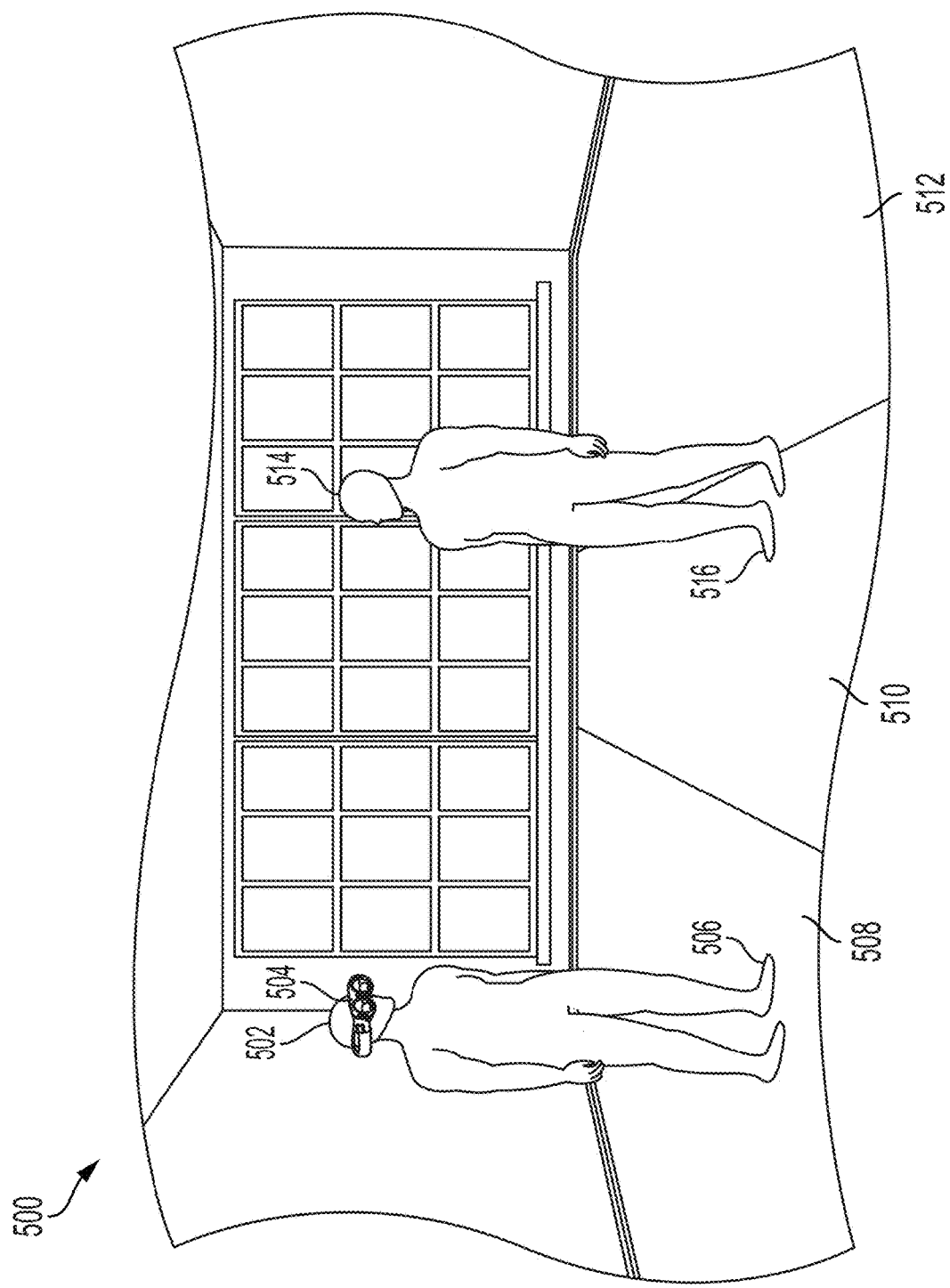
FIG. 5 illustrates an exemplary mixed reality environment, according to some embodiments.

FIG. 5 illustrates an exemplary mixed reality environment, according to some embodiments. FIG. 5 depicts MRE 500, which may include user 502 and MR system 504 (which can correspond to MR system 112, 200). MRE 500 can also include virtual character 514, which may be presented as moving around MRE 500. In some embodiments, virtual character 514 can be presented to user 502 via one or more transmissive displays of MR system 504, such as ones described herein. As virtual character 514 moves around MRE 500, user 502 may expect to hear sounds corresponding to footsteps of virtual character 514. For example, as virtual foot (and/or virtual footwear) 516 collides with carpeted ground surface 510, user 502 may expect to hear a sound corresponding to a bare foot colliding with carpet. In some embodiments, a realistic sound corresponding to a collision of virtual foot 516 and carpeted ground surface 510 can also be influenced by factors that may not be immediately visually apparent. For example, carpeted ground surface 510 may rest atop a wooden floor or a concrete floor, and a collision sound may differ depending on construction underneath a ground surface. It can be desirable to use one or more sensors of MR system 504 to determine a realistic collision sound between a virtual object and a real object. The corresponding sound may be presented via one or more speakers of MR system 504. MRE 500 may include several different ground surfaces, including wood ground surface 508 and/or tile ground surface 512. User 502 may therefore expect to hear different sounds as virtual foot 516 collides with wood ground surface 508, carpeted ground surface 510, and/or tile ground surface 512. The surfaces described with respect to FIG. 5 are merely exemplary; it is understood that surfaces including other materials may alternatively or additionally be a part of the MRE.

Presenting realistic sounds corresponding to a collision between a virtual object (e.g., virtual foot 516) and a real object (e.g., ground surfaces 508, 510, and/or 512) can be based on acoustic properties of the virtual object and the real object. In some embodiments, acoustic properties of virtual objects may be known and/or pre-defined (e.g., by a developer and/or creator of the virtual object). In some embodiments, properties of virtual objects may be retrieved (e.g., from a 3D game engine, such as Unreal or Unity). In some embodiments, acoustic properties of the real object may not be known and/or pre-defined, and acoustic properties of real objects may be determined from one or more sensors of MR system 504.

In some embodiments, acoustic properties of real objects may be determined with reduced user interaction. For example, user 502 may move around MRE 500 and the sounds produced by a collision between real foot 506 and ground surface 508, 510, and/or 512 may provide information that can be used to determine acoustic properties of those ground surfaces. This information can be analyzed and used in virtual sound synthesis. For example, after user 502 has moved around the ground surfaces in MRE 500 (and real footstep sounds have been recorded/analyzed), MR system 504 may have collected sufficient information to present realistic virtual sounds when a virtual object collides with any of the ground surfaces in MRE 500. In some embodiments, MR system 504 may continuously record audio and/or video. In some embodiments, a recorded audio and/or video stream may be stored in one or more buffers of MR system 504. A buffer may allow algorithms (e.g., footstep detection algorithms) to identify a time in which a footstep occurred, so MR system 504 may extract audio and/or video associated with the timestamp for further processing.

In some embodiments, acoustic properties can be manually tagged (e.g., in a mixed reality ecosystem such as Magic Leap's Magicverse). In some embodiments, the acoustic properties may be deduced by asking a user to generate a sound (e.g., by clapping, stomping, or tapping) near them. Sensors of the mixed reality system receive the sound (e.g., sound of the user's action reflected from the material being measured, and the ratio of returned acoustic energy to the transmitted acoustic energy is calculated), and the system may deduce an absorption coefficient and from the absorption coefficient and frequencies of the sounds, the material (e.g., wood, plastic, concrete) may be classified. Exemplary absorption coefficient values for different frequencies and different material may be found on datasheets such as www.acoustic.ua/st/web_absorption_data_eng.pdf; it is understood that the exemplary coefficient values and corresponding material and frequencies are not meant to limiting.

In some embodiments, sonar techniques (e.g., using a speaker of a mixed reality system) can be used to deduce absorption coefficients at various frequencies. Based on the ratio of returned acoustic energy to the transmitted acoustic energy, an estimate of the material can be deduced. In some embodiments, the mixed realty system can collide with the surface (e.g., the user hits (e.g., lightly) the surface with components of the mixed reality system), and inertial data (e.g., IMU derived force) and acoustic data (e.g., sound from the collision) may provide information about the material.

In some embodiments, MR system 504 may utilize headpose data to determine that a footstep has occurred. Headpose data can include a position of MR system 504 in three-dimensional space (e.g., in relation to persistent coordinate data) and/or an orientation of MR system 504. In some embodiments, headpose data may correlate with footsteps because a human head may move in particular patterns while walking. For example, a head of user 502 may move in a parabolic motion within a plane parallel to a ground surface. In some embodiments, a head of user 502 may also move up and/or down along a vertical axis (e.g., an axis normal to a ground surface, an axis parallel to a line from the user's head to toe). If a parabolic (or other suitable movement) is detected in the plane parallel to a ground surface and a movement is detected along a vertical axis within a time window, a footstep can be identified.

In some embodiments, movement thresholds can be applied to reduce false positives. In some embodiments, accuracy may be improved with a training phase. For example, a user may be asked to walk (e.g., prompted by the mixed reality system) with his or her footsteps occurring when an audible cue is issued. A rhythmic click track (e.g., metronome at 60 clicks per minute) may be played and the user may be prompted to begin walking after a certain number of clicks (e.g., on the fifth click, a one-bar count-in). The footsteps may be timed to occur when the metronome clicks (e.g., every one second at 60 clicks per minute). The headpose data associated with the training phase may then be added to a training corpus, with future headpose-deduced footsteps classified by a deep-learning algorithm.

In some embodiments, headpose data can be used to determine whether a left footstep or a right footstep has occurred. For example, a left footstep may be associated with a positive parabolic curve, and a right footstep may be associated with a negative parabolic curve. Paths of positive parabolic and negative parabolic curves may be in opposing directions.

Footsteps can also be identified using other suitable methods. For example, MR system 504 may include one or more IMUs of a wearable head device, and inertial data can be used to determine whether a footstep has occurred. In some embodiments, MR system 504 may include an auxiliary device (e.g., a belt-pack) that may be connected to a wearable head device, and the auxiliary device may include one or more IMUs. Inertial data from an auxiliary device may be used to determine whether a footstep has occurred. In some embodiments, machine learning and/or artificial intelligence can be used to determine whether a footstep has occurred. For example, a ground-truth data set can be established with manually identified footsteps and corresponding sensor data recorded at the time of the footstep (e.g., headpose data, IMU data, video data, audio data etc.). In some embodiments, a machine learning algorithm (e.g., a deep neural network) may be trained on the ground-truth data set (or a subset of the data set) to identify whether a footstep has occurred based on sensor data.

In some embodiments, identification of a footstep occurrence can be used to identify audio data associated with the footstep. For example, a timestamp associated with the footstep can be used to retrieve audio data (e.g., a particular audio segment) from a buffered audio stream. In some embodiments, the retrieved audio segment may be associated with at a specific position on the ground where the footstep occurred. Where a footstep occurred can be determined in any suitable way. For example, the footstep location can be based on the headpose at the time of the footstep. The footstep may be estimated as occurring near a projection of the headpose to the ground plane and offset to the left or right of the headpose projection. The offset can be an approximate value that may be appropriate for many users, or the offset can be customized for each user (e.g., using machine learning algorithms). It can be beneficial to associate the audio segment with specific positions because it may reveal unique characteristics about that particular position. For example, a particular floorboard may be squeaky, but the rest of a wooden floor may not have that acoustic characteristic. In some embodiments, the audio segment may be associated with an entire floor segment (which may be identified visually). For example, the footstep from real foot 506 on wooden ground surface 508 may be associated with the entirety of wooden ground surface 508. The boundary of an entirety of a surface may be determined using a sensor of the MR system 504 (e.g., an optical sensor) or pre-defined, as described herein. For example, a second MRE (e.g., in a different room of a house, a similar room in a different location) includes a ground surface similar to one in MRE 500. In accordance with a determination that the ground surface of the second MRE is similar to a previously identified ground surface (e.g., data associated with a footstep on the identified ground surface has been recorded), the MR system 504 may use data associated with the identified ground surface to determine acoustic properties of the ground surface of the second MRE.

In some embodiments, multiple audio segments collected on a particular ground surface may be aggregated and/or composited, and the composited sound may be associated with the ground surface. This can have the advantage of reducing an amount of memory required to associate audio segments with individual positions on a ground surface. In some embodiments, one or more acoustic properties can be determined from an audio segment, and the one or more acoustic properties may be associated with at least a portion of a real surface.

In some embodiments, a sound and/or acoustic property associated with a real surface can be transmitted to one or more remote servers. If other MR systems (or the same MR system) recognizes MRE 500, one or more remote servers may transmit the associated sound to the MR system so that virtual objects may produce realistic sounds upon colliding with known real surfaces. MR systems may continually transmit associated sounds to one or more remote servers (even if an associated sound has already been transmitted), and the associated sounds may be composited by one or more remote servers to continually refine an accuracy of the associated sound.

An audio segment associated with a footstep and/or real surface may be analyzed and/or processed. For example, acoustic characteristics such as base frequency, special peaks, whether the construction is hollow, and/or resonance properties may be extracted from the audio segment. In some embodiments, an audio signal corresponding to sound produced by a ground surface can be separated from other audio signals in the audio segment. For example, multiple audio segments can be recorded using different footwear on the same ground segment, which may allow an audio signal corresponding to the ground surface to be determined. In some embodiments, an audio signal corresponding to sound produced by a foot/footwear can be separated from other audio signals in the audio segment. For example, multiple audio segments can be recorded using the same foot/footwear on different ground segments, which may allow an audio signal corresponding to the foot/footwear to be determined. Audio signals, audio segments, and/or acoustic properties can be associated with portions of the ground segment and stored in MR system 504 and/or stored in one or more remote servers.

Video data can also be used to analyze and/or process audio segments associated with a footstep (or other collisions). In some embodiments, a video stream captured by one or more cameras on MR system 504 may include visual information that can be used to analyze audio data. For example, MR system 504 may identify wooden ground surface 508 as having a wooden appearance (e.g., detecting wood planks using edge detection and/or detecting wood grains using pattern recognition). This video information can be used, for example, to extract which portions of an audio segment correspond to a sound produced by the wooden ground surface 508 (as opposed to real foot 506) because MR system 504 may be able to identify audio signals based on known collision sounds with wooden surfaces. In some embodiments, video data can be used to identify different segments of ground surfaces. For example, video data can be used to identify that wooden ground surface 508 is likely a different material (and thereby should have a different sound) than carpeted ground surface 510, which is likely a different material than tile ground surface 512. Video data can also be used to identify where a particular ground surface begins and/or ends. These visual boundaries can be used to identify portions of ground surfaces that can be associated with particular audio segments and/or characteristics.

Once audio data has been processed, analyzed, associated with surfaces, and/or stored, the audio data can be used to generate sounds for collisions between virtual objects and known surfaces. Sounds for collisions can be generated during runtime operations as needed. For example, as virtual foot 516 collides with wooden ground surface 508, a sound can be generated and presented to user 502. The generated sound can correspond to a realistic sound that would accompany a collision between virtual foot 516 and wooden ground surface 508 if virtual foot 516 was "real." In some embodiments, an audio segment associated with wooden ground surface 508 (e.g., an audio segment recorded and/or processed during a collision between real foot 506 and wooden ground surface 508) can be played back to generate the sound. The audio segment may have been processed to reduce noise and/or to mitigate sounds that may not correspond to a collision (e.g., rustling of clothes during the recording of the audio segment, or user speech).

In some embodiments, an audio segment (e.g., one associated with wooden ground surface 508) can be processed using analysis-resynthesis techniques. For example, the audio segment can be time-stretched to account for a time between a heel strike and a toe strike. In some embodiments, a short time fast-Fourier transform can be applied to modulate and resynthesize the audio segment (e.g., to match a pace of virtual character 514). Other exemplary analysis-resynthesis techniques may include spectral modeling synthesis, wavelet analysis-resynthesis, MQ analysis-resynthesis, and phase vocoding.

In some embodiments, a sound can be generated using physical models of the colliding objects. For example, physical and/or acoustic characteristics of virtual foot 516 can be known and/or retrieved from one or more databases (e.g., external databases located on remote servers). A geometry of virtual foot 516 may be known to MR system 504, and material and/or acoustic properties may also be known and/or retrieved. In some embodiments, a physical model of how virtual foot 516 responds to a collision can be constructed, and audio can be generated based on the physical model. In some embodiments, a physical model of a ground surface can also be constructed. For example, audio segments and/or acoustic properties associated with the ground surface can be retrieved from memory and/or one or more remote servers. A physical model for a ground surface can be generated using estimated properties of the surface (e.g., a visual texture of the surface, resonance properties, base frequencies, whether the underlying construction is hollow, etc.). These properties may be estimated using one or more sensors of MR system 504 as described in more detail herein. Using the physical model for the ground surface, audio can be generated based on the sound a collision would produce based on the physical model.

Although methods and descriptions of this disclosure describe generating surface appropriate collision sounds between virtual feet and real floor surfaces, it is also contemplated that similar methods can be used for any collision between other virtual objects (e.g., non-foot) and real objects (e.g., non-floor surfaces). For example, MR system 504 may use video data and/or audio data to recognize when user 502 sets a real mug down on a table surface. This audio and/or video data may be analyzed and/or processed using techniques described herein to generate a collision sound for a virtual object and the same table surface.

In some embodiments, MR system 504 may request user interaction to determine acoustic properties of real materials. For example, a calibration period may request that a user tap various surfaces in the environment, so that acoustic data can be generated for those corresponding surfaces.

Figure 6:
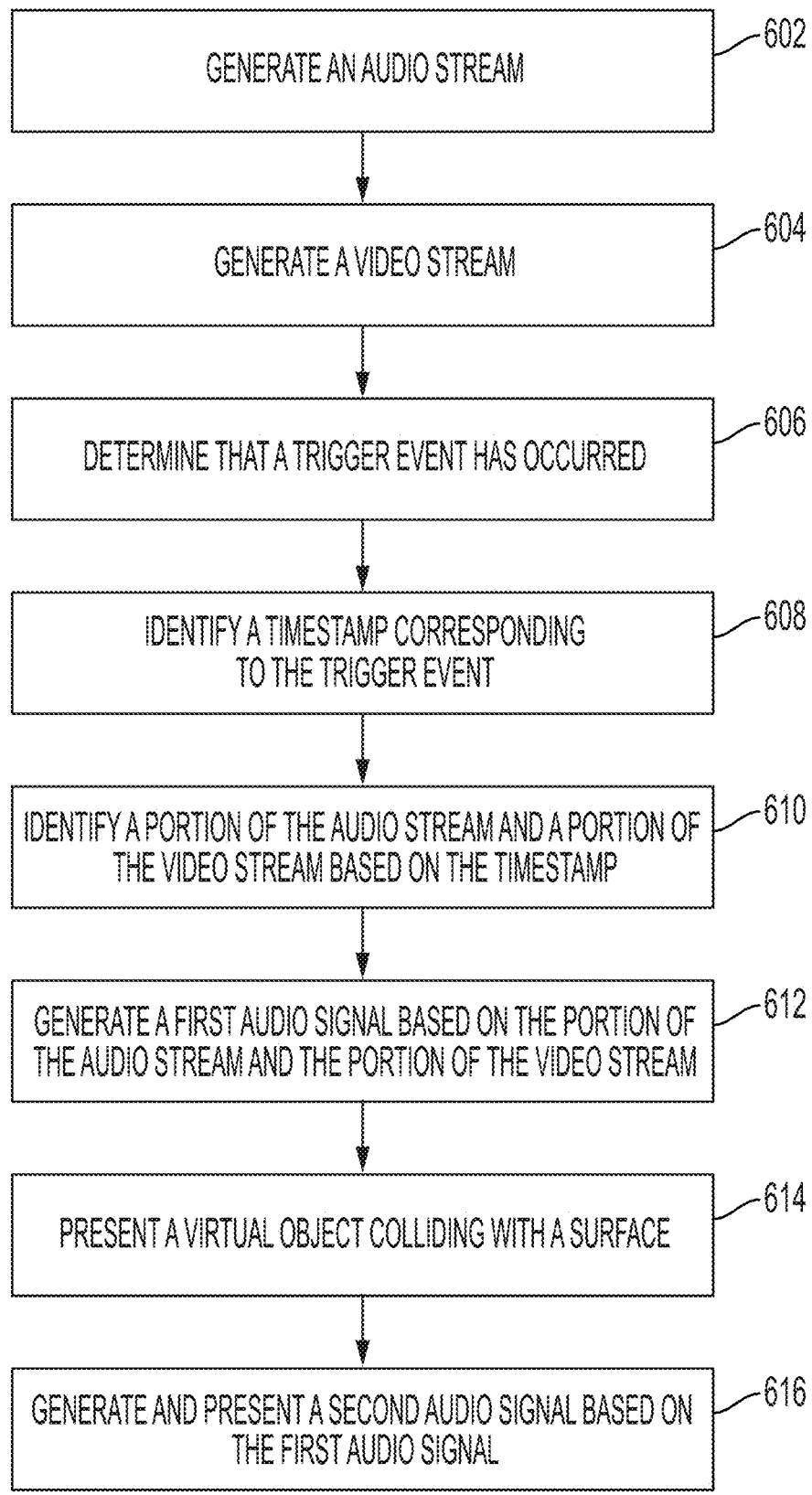
FIG. 6 illustrates an exemplary process for presenting audio content, according to some embodiments.

FIG. 6 illustrates an exemplary process for generating collision sounds, according to some embodiments. Examples of the steps of the process are additionally described with respect to FIG. 5.

At step 602, an audio stream can be generated (e.g., by one or more microphones of a wearable head device such as MR system 504). In some embodiments, an audio stream can be continually generated while a user (e.g., user 502) is using a MR system (e.g., MR system 504). In some embodiments, an audio stream can be generated during a period of time (e.g., a calibration period, when sufficient information is obtained regarding acoustic properties of a material in the real environment). The audio stream can be stored in one or more buffers and may include timestamps and coordinates (e.g., location in the MRE, user location) corresponding to when and where the audio stream is being recorded. The audio stream may include information about a sound of a real object colliding with a real surface of a real environment.

At step 604, a video stream can be generated (e.g., by one or more cameras of a wearable head device such as MR system 504). In some embodiments, a video stream can be continually generated while a user (e.g., user 502) is using a MR system (e.g., MR system 504). In some embodiments, a video stream can be generated during a period of time (e.g., a calibration period, when sufficient information is obtained regarding acoustic properties of a material in the real environment). The video stream can be stored in one or more buffers and may include timestamps and coordinates (e.g., location in the MRE, user location) corresponding to when and where the video stream is being recorded. The video stream may include information the real surface of the real environment (e.g., visual information related to a material of the real surface).

At step 606, it can be determined whether a trigger event has occurred. In some embodiments, a trigger event can include an event which may be associated with a sound of interest. For example, a footstep on a ground surface can be considered a trigger event if it is desired to generate sounds of footstep collisions. In some embodiments, it can be determined if a footstep has occurred using headpose and/or IMU data of a wearable head device (e.g., MR system 504). Determination of whether a footstep occurred is described with respect to FIG. 5. For the sake of brevity, this will not be described again here.

Generally, the sound of interest may be a sound of a real object colliding with a surface of a real environment. As another example, a real object colliding with a real object in the real environment can be considered a trigger event. A sensor of a MR system may be used to determine whether a trigger event has occurred.

At step 608, a second timestamp corresponding to the trigger event can be identified. In some embodiments, the second timestamp can be identified in response to determining that a trigger event has occurred.

At step 610, a portion of the audio stream and/or a portion of the video stream can be identified based on the second timestamp. The second timestamp may be a portion of timestamps of the audio stream and/or video stream generated in steps 602 and/or 604 (e.g., the trigger event occurred during generations of the audio stream and/or video stream). In some embodiments, the portion of the audio stream and the portion of the video stream can be identified in accordance with a determination that a trigger event has occurred. In some embodiments, the portion of the audio stream and/or video stream can include a period of time before and/or a period of time after the second timestamp.

At step 612, a first audio signal can be generated based on the identified portion of the audio stream and/or the identified portion of the video stream. In some embodiments, the first audio signal is associated with a sound of a virtual object colliding with a surface of a real environment (e.g., the surface associated with the trigger event). In some embodiments, the first audio signal can include the portion of the audio stream. In some embodiments, generating the first audio signal can include processing and/or analyzing the portion of the audio stream as described herein. In some embodiments, generating the first audio signal can include using one or more acoustic characteristics, which may be determined from the portion of the audio stream. In some embodiments, the first audio signal can be associated with a position of the trigger event. A position of the trigger event can be determined based on headpose data associated with the timestamp of the trigger event using techniques described herein.

At step 614, a virtual object can be presented as colliding with a surface (e.g., a real surface, the surface associated with the trigger event). For example, virtual character 514 may walk around MRE 500, and virtual foot 516 may be presented as colliding with carpeted ground surface 510. In some embodiments, a virtual object can be presented as colliding with a surface via one or more transmissive displays of a wearable head device (e.g., MR system 504).

At step 616, a second audio signal can be generated and presented based on the first audio signal. In some embodiments, the second audio signal corresponds to a sound created by a virtual object colliding with a surface. In some embodiments, the second audio signal can be presented via one or more speakers of a wearable head device (e.g., MR system 504). In some embodiments, the second audio signal can include the first audio signal. For example, the first audio signal can be replayed as the second audio signal. In some embodiments, generating the second audio signal can include performing analysis-resynthesis on the first audio signal. In some embodiments, generating the second audio signal can include generating a physical model corresponding toe the virtual object and generating a physical model corresponding to the surface. The physical models can be used to generate the second audio signal.

According to some embodiments, a method comprises: generating, via a microphone of a wearable head device, an audio stream; generating, via a sensor of the wearable head device, a video stream; determining that a trigger event has occurred; in accordance with a determination that the trigger event has occurred: identifying a timestamp associated with the trigger event; identifying a portion of the audio stream based on the timestamp; identifying a portion of the video stream based on the timestamp; and generating a first audio signal based on at least one of the portion of the audio stream and the portion of the video stream; presenting a virtual object colliding with a surface, wherein the surface is associated with the trigger event; generating a second audio signal based on the first audio signal; and presenting the second audio signal.

According to some embodiments, the trigger event comprises a footstep on the surface.

According to some embodiments, determining that the trigger event has occurred is based on movement data of the wearable head device.

According to some embodiments, determining that the trigger event has occurred is based on inertial data of the wearable head device.

According to some embodiments, determining that the trigger event has occurred is based on inertial data of an auxiliary device, and the auxiliary device is coupled to the wearable head device.

According to some embodiments, the method further comprises: in accordance with the determination that the trigger event has occurred: identifying a position of the wearable head device based on the timestamp; determining a position of the trigger event based on the position of the wearable head device; and associating the position of the trigger event with the first audio signal.

According to some embodiments, the method further comprises: determining a position of the collision of the virtual object with the surface; and determining whether the position of the collision of the virtual object with the surface is associated with the position of the trigger event, wherein generating the second audio signal is further based on a determination that the position of the collision of the virtual object with the surface is associated with the position of the trigger event.

According to some embodiments, generating the second audio signal is further based on at least one of a physical model of the surface and a physical model of the virtual object.

According to some embodiments, generating the second audio signal is further based on analysis-and-resynthesis of the first audio signal.

According to some embodiments, the method further comprises: in accordance with the determination that the trigger event has occurred, associating the first audio signal with the surface.

According to some embodiments, the second audio signal corresponds to the collision of the virtual object with the surface.

According to some embodiments, the method further comprises storing the first audio signal, wherein: the collision of the virtual object with the surface is presented on a display of a second wearable head device, and generating the second audio signal is further based on the stored first audio signal.

According to some embodiments, the method further comprises: generating a second audio stream; generating a second video stream; determining that a second trigger event has occurred; in accordance with a determination that the second trigger event has occurred: identifying a second timestamp associated with the trigger event; identifying a portion of the second audio stream based on the second timestamp; identifying a portion of the second video stream based on the second timestamp; and generating a third audio signal based on at least one of the portion of the second audio stream and the portion of the second video stream, wherein generating the second audio signal is further based on the third audio signal.

According to some embodiments, the video stream includes information associated with the surface.

According to some embodiments, the virtual object comprises a foot of a virtual character.

According to some embodiments, a material of the surface is associated with an acoustic property, and generating the second audio signal is further based on the acoustic property of the material of the surface.

According to some embodiments, the method further comprises determining the acoustic property of the material of the surface based on at least one of measured coefficient of absorption of the material, manual definition, acoustic data, and inertial data.

According to some embodiments, a system comprises: a microphone; a sensor; a display; an audio output; and one or more processors configured to execute a method comprising: generating, via the microphone, an audio stream; generating, via the sensor, a video stream; determining that a trigger event has occurred; in accordance with a determination that the trigger event has occurred: identifying a timestamp associated with the trigger event; identifying a portion of the audio stream based on the timestamp; identifying a portion of the video stream based on the timestamp; and generating a first audio signal based on at least one of the portion of the audio stream and the portion of the video stream; presenting, on the display, a virtual object colliding with a surface, wherein the surface is associated with the trigger event; generating a second audio signal based on the first audio signal; and presenting, via the audio output, the second audio signal.

According to some embodiments, the trigger event comprises a footstep on the surface.

According to some embodiments, the system further comprises a second sensor, wherein determining that the trigger event has occurred is based on movement data captured by the second sensor.

According to some embodiments, the system further comprises an inertial measurement unit, wherein determining that the trigger event has occurred is based on inertial data captured by the inertial measurement unit.

According to some embodiments, the system further comprises an auxiliary device and a wearable head device, wherein: determining that the trigger event has occurred is based on inertial data of the auxiliary device, and the auxiliary device is coupled to the wearable head device.

According to some embodiments, the method further comprises: in accordance with the determination that the trigger event has occurred: identifying a position of a wearable head device of the system based on the timestamp; determining a position of the trigger event based on the position of the wearable head device of the system; and associating the position of the trigger event with the first audio signal.

According to some embodiments, the method further comprises: determining a position of the collision of the virtual object with the surface; and determining whether the position of the collision of the virtual object with the surface is associated with the position of the trigger event, wherein generating the second audio signal is further based on a determination that the position of the collision of the virtual object with the surface is associated with the position of the trigger event.

According to some embodiments, generating the second audio signal is further based on at least one of a physical model of the surface and a physical model of the virtual object.

According to some embodiments, generating the second audio signal is further based on analysis-and-resynthesis of the first audio signal.

According to some embodiments, the method further comprises: in accordance with the determination that the trigger event has occurred, associating the first audio signal with the surface.

According to some embodiments, the second audio signal corresponds to the collision of the virtual object with the surface.

According to some embodiments, the method further comprises storing the first audio signal, wherein: the collision of the virtual object with the surface is presented on a display of a second system, and generating the second audio signal is further based on the stored first audio signal.

According to some embodiments, the method further comprises: generating a second audio stream; generating a second video stream; determining that a second trigger event has occurred; in accordance with a determination that the second trigger event has occurred: identifying a second timestamp associated with the trigger event; identifying a portion of the second audio stream based on the second timestamp; identifying a portion of the second video stream based on the second timestamp; and generating a third audio signal based on at least one of the portion of the second audio stream and the portion of the second video stream; wherein generating the second audio signal is further based on the third audio signal.

According to some embodiments, the video stream includes information associated with the surface.

According to some embodiments, the virtual object comprises a foot of a virtual character.

According to some embodiments, a material of the surface is associated with an acoustic property, and generating the second audio signal is further based on the acoustic property of the material of the surface.

According to some embodiments, the method further comprises determining the acoustic property of the material of the surface based on at least one of measured coefficient of absorption of the material, manual definition, acoustic data, and inertial data.

According to some embodiments, a non-transitory computer-readable medium stores one or more instructions, which, when executed by one or more processors of an electronic device, cause the device to perform a method comprising: generating, via a microphone of a wearable head device, an audio stream; generating, via a sensor of the wearable head device, a video stream; determining that a trigger event has occurred; in accordance with a determination that the trigger event has occurred: identifying a timestamp associated with the trigger event; identifying a portion of the audio stream based on the timestamp; identifying a portion of the video stream based on the timestamp; and generating a first audio signal based on at least one of the portion of the audio stream and the portion of the video stream; presenting a virtual object colliding with a surface, wherein the surface is associated with the trigger event; generating a second audio signal based on the first audio signal; and presenting the second audio signal.

According to some embodiments, the trigger event comprises a footstep on the surface.

According to some embodiments, determining that the trigger event has occurred is based on movement data of the wearable head device.

According to some embodiments, determining that the trigger event has occurred is based on inertial data of the wearable head device.

According to some embodiments, determining that the trigger event has occurred is based on inertial data of an auxiliary device, and the auxiliary device is coupled to the wearable head device.

According to some embodiments, the method further comprises: in accordance with the determination that the trigger event has occurred: identifying a position of the wearable head device based on the timestamp; determining a position of the trigger event based on the position of the wearable head device; and associating the position of the trigger event with the first audio signal.

According to some embodiments, the method further comprises: determining a position of the collision of the virtual object with the surface; and determining whether the position of the collision of the virtual object with the surface is associated with the position of the trigger event, wherein generating the second audio signal is further based on a determination that the position of the collision of the virtual object with the surface is associated with the position of the trigger event.

According to some embodiments, generating the second audio signal is further based on at least one of a physical model of the surface and a physical model of the virtual object.

According to some embodiments, generating the second audio signal is further based on analysis-and-resynthesis of the first audio signal.

According to some embodiments, the method further comprises: in accordance with the determination that the trigger event has occurred, associating the first audio signal with the surface.

According to some embodiments, the second audio signal corresponds to the collision of the virtual object with the surface.

According to some embodiments, the method further comprises storing the first audio signal, wherein: the collision of the virtual object with the surface is presented on a display of a second wearable head device, and generating the second audio signal is further based on the stored first audio signal.

According to some embodiments, the method further comprises: generating a second audio stream; generating a second video stream; determining that a second trigger event has occurred; in accordance with a determination that the second trigger event has occurred: identifying a second timestamp associated with the trigger event; identifying a portion of the second audio stream based on the second timestamp; identifying a portion of the second video stream based on the second timestamp; and generating a third audio signal based on at least one of the portion of the second audio stream and the portion of the second video stream, wherein generating the second audio signal is further based on the third audio signal.

According to some embodiments, the video stream includes information associated with the surface.

According to some embodiments, the virtual object comprises a foot of a virtual character.

According to some embodiments, a material of the surface is associated with an acoustic property, and generating the second audio signal is further based on the acoustic property of the material of the surface.

According to some embodiments, the method further comprises determining the acoustic property of the material of the surface based on at least one of measured coefficient of absorption of the material, manual definition, acoustic data, and inertial data.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

The invention claimed is:

1. A system comprising:
   a microphone;
   a display;
   an audio output; and
   one or more processors configured to execute a method comprising:
      at a first time, detecting a footstep, of a user, on a surface;
      in accordance with said detecting the footstep, determining, via a detection of the footstep by the microphone, an acoustic property of the surface;

at a second time, detecting a collision of a virtual object with the surface;

in accordance with said detecting the collision:
 presenting to the user, on the display, a view of the collision;
 generating an audio signal based on the collision and based further on the acoustic property of the surface; and
 presenting to the user, via the audio output, concurrently with presenting the view of the collision, the audio signal.

2. The system of claim 1, further comprising a sensor, wherein said detecting the footstep is based on movement data of the user captured by the sensor.

3. The system of claim 1, further comprising an inertial measurement unit, wherein said detecting the footstep is based on inertial data of the user captured by the inertial measurement unit.

4. The system of claim 1, further comprising a wearable auxiliary device and a wearable head device, wherein:
 the wearable auxiliary device comprises the one or more processors, and
 the auxiliary device is coupled to the wearable head device.

5. The system of claim 1, wherein the system further comprises a wearable head device and wherein the method further comprises:
 in accordance with said detecting the footstep:
  determining a position of the wearable head device of the system; and
  determining a position of the footstep based on the position of the wearable head device of the system;
 wherein said generating the audio signal is further based on the position of the footstep.

6. The system of claim 5, wherein:
 the view of the collision comprises a view of the virtual object colliding with the surface at the position of the footstep.

7. The system of claim 1, wherein said generating the audio signal is further based on at least one of a physical model of the surface and a physical model of the virtual object.

8. The system of claim 1, wherein said generating the audio signal is further based on an analysis of an audio stream associated with the audio signal.

9. The system of claim 1, wherein the method further comprises associating the audio signal with the surface.

10. The system of claim 1, wherein the audio signal corresponds to the collision of the virtual object with the surface.

11. The system of claim 1, wherein:
 said generating the audio signal is further based on a stored audio signal.

12. The system of claim 1, wherein the method further comprises:
 detecting a second collision with a second surface;
 in accordance with the detection of the second collision:
  identifying a portion of an audio stream associated with the audio signal;
  generating a second audio signal based on the portion of the audio stream and based further on the acoustic property of the surface; and
  presenting to the user, via the audio output, the second audio signal.

13. The system of claim 1, wherein:
 the audio signal is associated with a video stream,
 the video stream includes information associated with the surface, and
 said generating the audio signal is based further on the information.

14. The system of claim 1, wherein the virtual object comprises a foot of a virtual character.

15. The system of claim 1, wherein:
 the acoustic property comprises a property of a material of the surface.

16. The system of claim 15, wherein said determining the acoustic property is based on a coefficient of absorption of the material.

17. A method comprising:
 at a first time, detecting a footstep, of a user, on a surface;
 in accordance with said detecting the footstep, determining, via a detection of the footstep by a microphone, an acoustic property of the surface;
 at a second time, detecting a collision of a virtual object with the surface;
 in accordance with said detecting the collision:
  presenting to the user, on a display, a view of the collision;
  generating an audio signal based on the collision and based further on the acoustic property of the surface; and
  presenting to the user, via an audio output, concurrently with presenting the view of the collision, the audio signal.

18. The method of claim 17, wherein said detecting the footstep is based on movement data of the user captured by a sensor.

19. The method of claim 17, wherein said detecting the footstep is based on inertial data of the user captured by an inertial measurement unit.

20. A non-transitory computer-readable medium storing one or more instructions, which, when executed by one or more processors, cause the one or more processors to perform a method comprising:
 at a first time, detecting a footstep, of a user, on a surface;
 in accordance with said detecting the footstep, determining, via a detection of the footstep by a microphone, an acoustic property of the surface;
 at a second time, detecting a collision of a virtual object with the surface;
 in accordance with said detecting the collision:
  presenting to the user, on a display, a view of the collision;
  generating an audio signal based on the collision and based further on the acoustic property of the surface; and
  presenting to the user, via an audio output, concurrently with presenting the view of the collision, the audio signal.

* * * * *